US010518838B2

(12) United States Patent
Chang

(10) Patent No.: US 10,518,838 B2
(45) Date of Patent: Dec. 31, 2019

(54) FRAME OF A VEHICLE WITH FRONT WHEELS

(71) Applicant: Fu-Long Chang, Chiayi (TW)

(72) Inventor: Fu-Long Chang, Chiayi (TW)

( * ) Notice: Subject to any disclaimer, the term of this patent is extended or adjusted under 35 U.S.C. 154(b) by 135 days.

(21) Appl. No.: 15/450,960

(22) Filed: Mar. 6, 2017

(65) Prior Publication Data

US 2017/0259875 A1 Sep. 14, 2017

(30) Foreign Application Priority Data

Mar. 11, 2016 (CN) .......................... 2016 1 0157690

(51) Int. Cl.

| | |
|---|---|
| ***B62K 25/06*** | (2006.01) |
| ***B62K 5/01*** | (2013.01) |
| ***B62K 5/027*** | (2013.01) |
| ***B62K 5/06*** | (2006.01) |
| ***B62K 21/02*** | (2006.01) |
| *B62K 5/00* | (2013.01) |

(52) U.S. Cl.

CPC ................ *B62K 25/06* (2013.01); *B62K 5/01* (2013.01); *B62K 5/027* (2013.01); *B62K 5/06* (2013.01); *B62K 21/02* (2013.01); *B62K 2005/001* (2013.01)

(58) Field of Classification Search

CPC . B62K 5/01; B62K 5/027; B62K 5/05; B62K 5/08; B62K 5/10; B62D 9/02; B60G 21/007; B60G 21/05

USPC .................................................. 280/124.103

See application file for complete search history.

(56) References Cited

U.S. PATENT DOCUMENTS

| | | | | |
|---|---|---|---|---|
| 4,887,829 A * | 12/1989 | Prince | B60G 21/05 | 280/282 |
| 5,474,144 A * | 12/1995 | Tarng | B62D 61/04 | 180/264 |
| 5,611,555 A * | 3/1997 | Vidal | B60G 3/14 | 180/215 |
| 7,731,210 B2 * | 6/2010 | Pedersen | B60G 21/007 | 180/209 |
| 7,878,290 B2 * | 2/2011 | Tsujii | B60G 3/145 | 180/215 |
| 9,604,687 B2 * | 3/2017 | Asano | B60G 21/05 | |
| 2006/0151232 A1 * | 7/2006 | Marcacci | B60G 21/007 | 180/414 |
| 2009/0020352 A1 * | 1/2009 | Horii | B62K 5/027 | 180/212 |

(Continued)

FOREIGN PATENT DOCUMENTS

| | | | |
|---|---|---|---|
| JP | 05139357 A * | 6/1993 | B62K 5/10 |
| WO | WO-2004045941 A1 * | 6/2004 | B62K 5/05 |

*Primary Examiner* — Joseph M Rocca
*Assistant Examiner* — Felicia L. Brittman
(74) *Attorney, Agent, or Firm* — Muncy, Geissler, Olds & Lowe, P.C.

(57) ABSTRACT

A frame of a vehicle includes a front fork unit pivotably connected to a head tube of a vehicle body mechanism, a crank axle disposed on the front fork unit for two front-wheel cranks to be pivoted thereon. Two front wheels are pivotably disposed on the cranks, respectively. A front-wheel counteracting mechanism is pivotably connected between each of the cranks and the front fork unit to transmit an impact force to the cranks so as to cause opposite upward and downward movements of the front wheels to thereby keep the front wheels in contact with the ground and to render movement of the vehicle steady and safe.

16 Claims, 26 Drawing Sheets

3 32 22 6 63 62 61 321 411 4 412 41 415 415 412 34 2 21 33 34 33

(56) References Cited

U.S. PATENT DOCUMENTS

| | | | | |
|---|---|---|---|---|
| 2010/0025944 | A1* | 2/2010 | Hara | B62D 9/02 280/5.509 |
| 2011/0254238 | A1* | 10/2011 | Kanou | B62K 5/025 280/5.509 |
| 2013/0168944 | A1* | 7/2013 | Bartolozzi | B60G 3/01 280/269 |
| 2014/0375015 | A1* | 12/2014 | Yu | B62K 5/027 280/267 |
| 2016/0152293 | A1* | 6/2016 | Hirayama | B62K 5/05 280/124.103 |
| 2016/0185413 | A1* | 6/2016 | Takano | B62K 21/00 280/124.103 |
| 2017/0088232 | A1* | 3/2017 | Kaneta | B62L 1/005 |

* cited by examiner

FRAME OF A VEHICLE WITH FRONT WHEELS

CROSS-REFERENCE TO RELATED APPLICATION

This application claims priority of Chinese Patent Application No. 201610157690.0, filed on Mar. 11, 2016.

FIELD

The disclosure relates to a frame of a vehicle, and more particularly to a frame of a vehicle with two front wheels, such as a tricycle, a motor tricycle, a motor quadricycle with two front wheels.

BACKGROUND

Motorized bicycles with small-size and high-speed are common means of transportation in a city. With two wheels arranged in a line, a conventional motorized bicycle tends to sideslip when making a sharp turn, may experience undesired drift during braking, and may easily lose balance and yaw when the bicycle is first started to move or moves slowly, thereby imposing potential danger to the rider. Therefore, a motorized tricycle or quadricycle is developed due to superior steadiness and safety thereof.

SUMMARY

Therefore, an object of the disclosure is to provide a frame of a vehicle with two front wheels which has superior controllability and steadiness.

According to the disclosure, the frame of the vehicle includes a vehicle body mechanism, a front wheel frame mechanism, a front-wheel counteracting mechanism and a rear wheel frame mechanism. The vehicle body mechanism includes a head tube. The front wheel frame mechanism includes a front fork unit which is pivotably connected to the head tube to be rotatable about the head tube, a crank axle which is disposed on and extends in a left-and-right direction from a lower fork end portion of the front fork unit, and two front-wheel cranks each of which is pivoted on the crank axle at a crank end thereof, and each of which has a free end that is swingable about the crank axle and on that a respective front wheel is pivotably disposed. Each of the front-wheel cranks has a front exerting force pivot point interposed between the crank end and the free end. The front-wheel counteracting mechanism is pivotably connected to the front exerting force pivot points of the front-wheel cranks and the front fork unit, and is configured to transmit upward and downward movements of the front wheels, to absorb shocks happened onto the front wheels, and to keep the front wheels, while off the ground, in a proper position for retouching down. The rear wheel frame mechanism is mounted on the vehicle body mechanism and on which at least one rear wheel is pivotably mounted.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
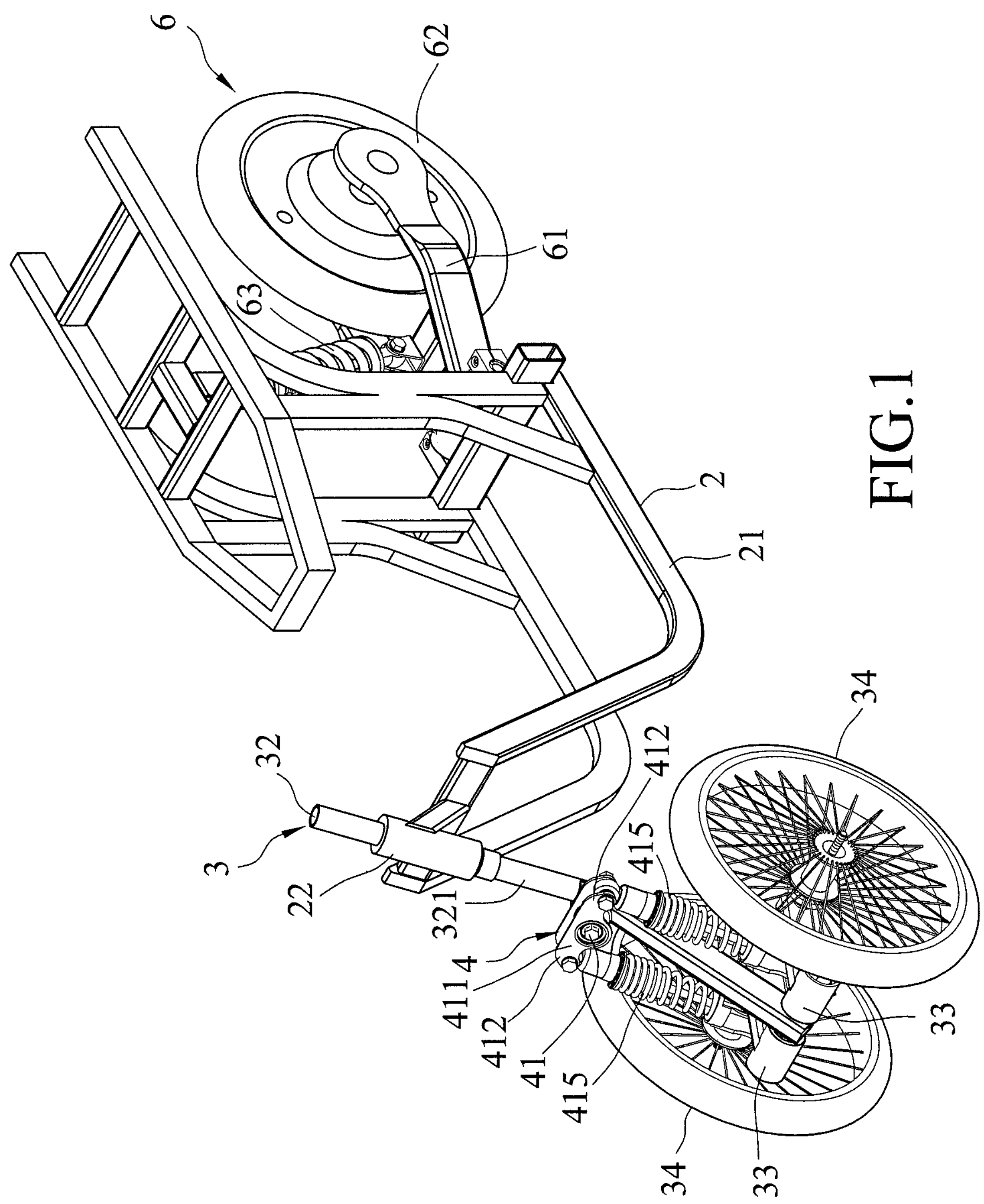
FIG. 1 is a perspective view illustrating a first embodiment of a frame of a vehicle according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
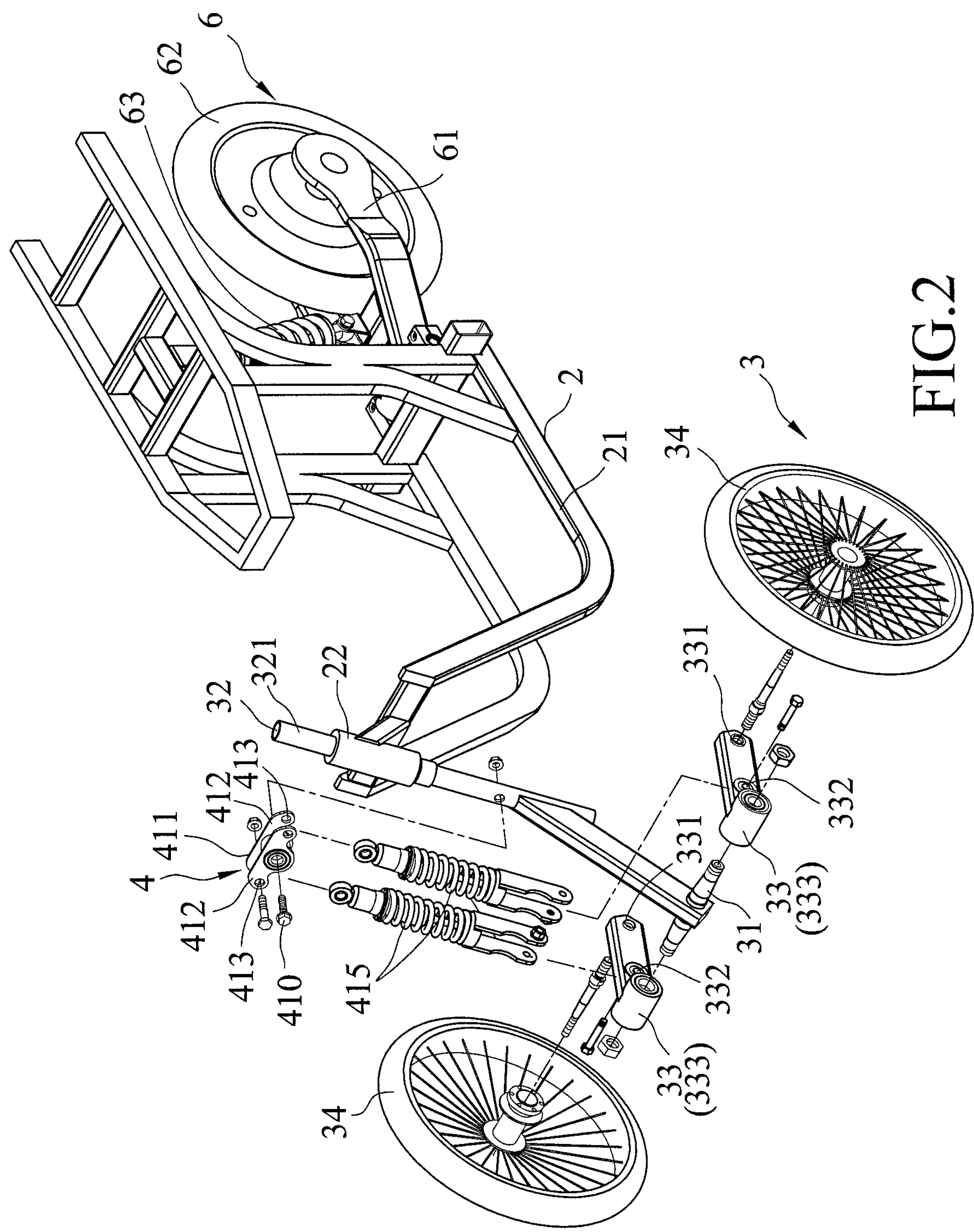
FIG. 2 is a partly-exploded perspective view of the first embodiment.

Referring to FIGS. 1 and 2, a first embodiment of a frame of a vehicle is adapted for a seat, a cover, an engine driving element, a control system, etc. to be mounted thereon so as to be assembled as a motorized tricycle. The frame includes a vehicle body mechanism 2, a front wheel frame mechanism 3 mounted at a front side of the vehicle body mechanism 2, a front-wheel counteracting mechanism 4 mounted on the front wheel frame mechanism 3, and a rear wheel frame mechanism 6 mounted at a rear side of the vehicle body mechanism 2.

The vehicle body mechanism 2 includes a main body 21 and a head tube 22 which is securely connected to a front end of the main body 21 and which extends in an upper-and-lower direction. Since the main body 21 of a vehicle frame is a known type, a detailed description of the structure thereof will not be provided herein and is not limited to that illustrated in FIG. 2.

The front wheel frame mechanism 3 includes a front fork unit 32 which extends in the upper-and-lower direction through and which is pivotably connected to the head tube 22 to be rotatable about the head tube 22, a crank axle 31 which is disposed on and extends in a left-and-right direction from a lower fork end portion of the front fork unit 32, and two front-wheel cranks 33 each of which is pivoted on the crank axle 31 at a crank end 333 thereof, and each of which has a free end 331 that is rearwardly of the crank end 333 and that is swingable about the crank axle 31. A front wheel 34 is pivotably disposed on the free end 331.

Specifically, the front fork unit 32 has a front fork tube 321 journalled on the head tube 22 and extending in the upper-and-lower direction to have the lower fork end portion on which the crank axle 31 is disposed. The front-wheel cranks 33 are disposed at left and right sides of the front fork tube 321, respectively. Each of the front-wheel cranks 33 has a front exerting force pivot point 332 which is interposed between the crank end 333 where the crank axle 31 is pivotably connected, and the free end 331 where the respective front wheel 34 is pivotably connected.

The front-wheel counteracting mechanism 4 is pivotably connected to the front exerting force pivot points 332 of the front-wheel cranks 33 and the front fork tube 321, and is configured to transmit upward and downward movements of the front wheels 34, to absorb shocks happened onto the front wheels 34, and to keep the front wheels 34, while off the ground, in a proper position for retouching down. Specifically, the front-wheel counteracting mechanism 4 includes a pivot axle 410 extending in a front-and-rear direction from the front fork tube 321 and below the head tube 22, a front seesaw arm 411 pivotably disposed on the pivot axle 410 at a middle portion thereof and having left and right arm ends 412, and two front damping members 415, each pivotably connected between one of the left and right arm ends 412 and the front exerting force pivot point 332 of the respective front-wheel crank 33. In this embodiment, the front damping member 415 is a spring shock absorber with hydraulic damper.

The left and right arm ends 412 respectively have pivot points 413 at which the front damping members 415 are respectively and pivotably connected. The distance between a connecting line of the pivot points 413 and a center of the pivot axle 410 is no restriction. In this embodiment, each of the pivot points 413 is higher than the center of the pivot axle 410.

The rear wheel frame mechanism 6 includes a rear wheel fork 61 which is pivotably connected to the vehicle body mechanism 2 and on which a rear wheel 62 is pivotably mounted, and a rear damping member 63 which extends in the upper-and-lower direction and which is pivotably connected between the rear wheel fork 61 and the vehicle body mechanism 2. In this embodiment, the rear damping member 63 is a spring shock absorber with hydraulic damper.

Through the mechanically transmitting construction of the front wheel frame mechanism 3 and the front-wheel counteracting mechanism 4, once the front wheel 34 at a left side passes over a bump on the ground, the free end 331 of the respective front-wheel crank 33 moves upwardly and presses the respective front damping member 415 upward so as to cause pivoting movement of the front seesaw arm 411 to bring the left arm end 412 up and the right arm end 412 down. At this time, the front damping member 415 at the right side is pressed downward to move the free end 331 of the front-wheel crank 33 at the right side downwardly, so that the front wheel at the right side is moved downwardly as well. Hence, with the front-wheel counteracting mechanism 4, the front wheels 34 can be kept in contact with the ground with a good grip to render the vehicle balanced in the left-and-right direction, thereby enhancing the steadiness and safety during driving thereof.

Likewise, when a rider tilts laterally the vehicle body mechanism 2 to press on a side of the front fork unit 32, the front wheel 34 at the pressed side is lifted relative to the front fork unit 32 to cause a downward movement of the front wheel 34 at the other side by the mechanical transmission of the front-wheel counteracting mechanism 4 to thereby keep the front wheels 34 in contact with the ground with a good grip.

When the both front wheels 34 pass over a bump on the ground, an impact force is absorbed by the front damping members 415. Moreover, when the front wheels 34 pass over a pit on the ground or run off the ground, the front-wheel cranks 33 are moved slowly and downwardly relative to the front fork unit 32 by means of the front damping members 415 until the front damping members 415 reach to their expanded state. In this state, the front-wheel cranks 33 are prevented from falling so as to keep the front wheels 34 in proper position and to ensure a smooth landing.

In this embodiment, the front-wheel cranks 33 are disposed to extend rearwardly from the crank axle 31.

In a various embodiment, the front-wheel cranks 33 may extend forwardly from the crank axle 31 so as to place the free ends 331 forwardly of the crank axle 31.

Figure 3:
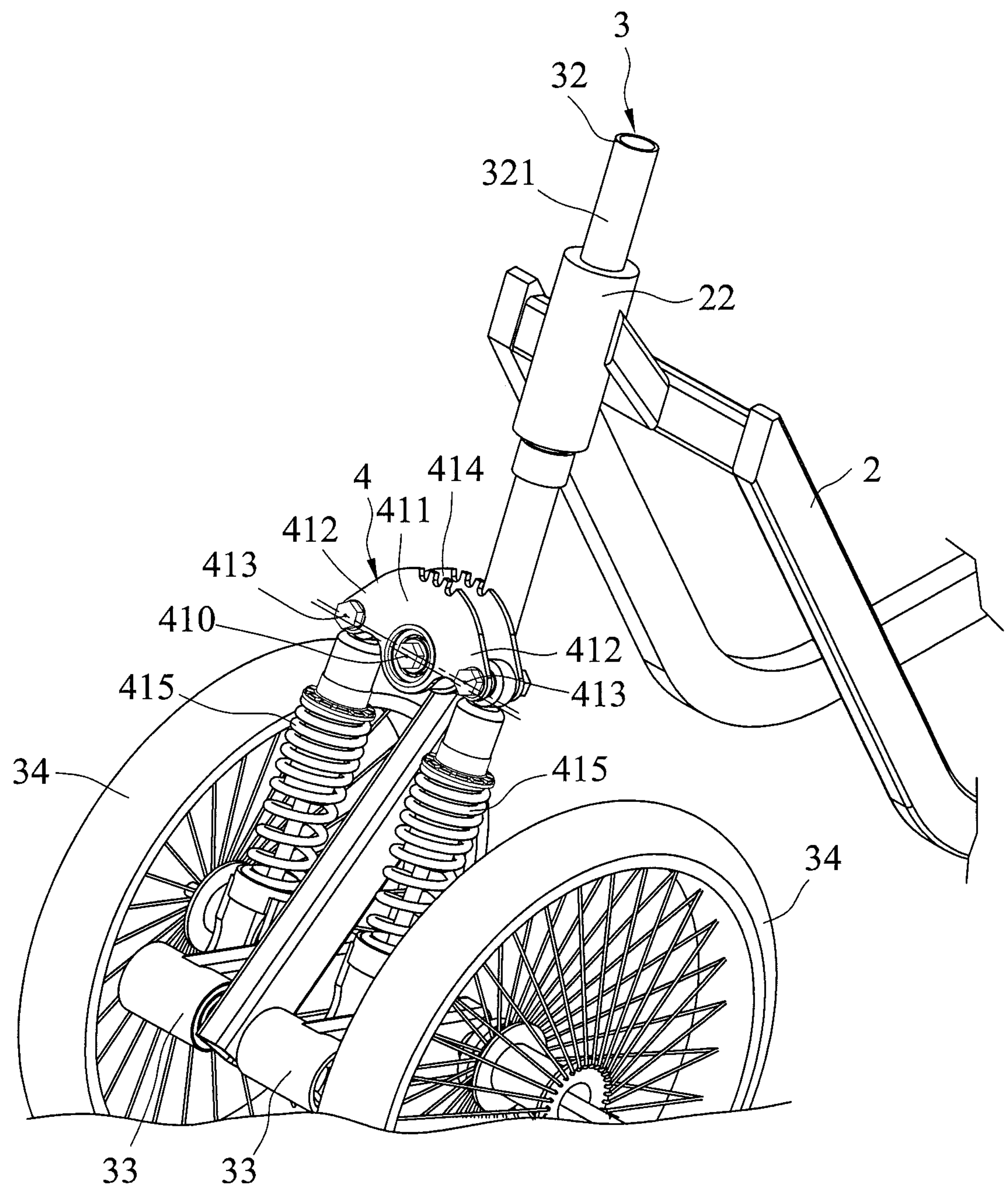
FIG. 3 is a fragmentary perspective view of a second embodiment of the frame according to the disclosure.

Referring to FIG. 3, in a second embodiment, the frame is adapted to be used with a locking member (not shown).

The locking member is mounted on the front fork unit 32 or a fixed place of the vehicle body mechanism 2, such as the head tube 22. The front seesaw arm 411 has a locking slot 414 formed in an upper wall thereof to be releasably engaged with the locking member so as to retain the front seesaw arm 411 to the front fork unit 32 or the vehicle body mechanism 2 to thereby prevent pivoting movement of the front seesaw arm 411 about the pivot axle 410.

In this state, the front-wheel counteracting mechanism 4 is locked such that the front wheels 34 are moved synchronously in the upper-and-lower direction.

Figure 4:
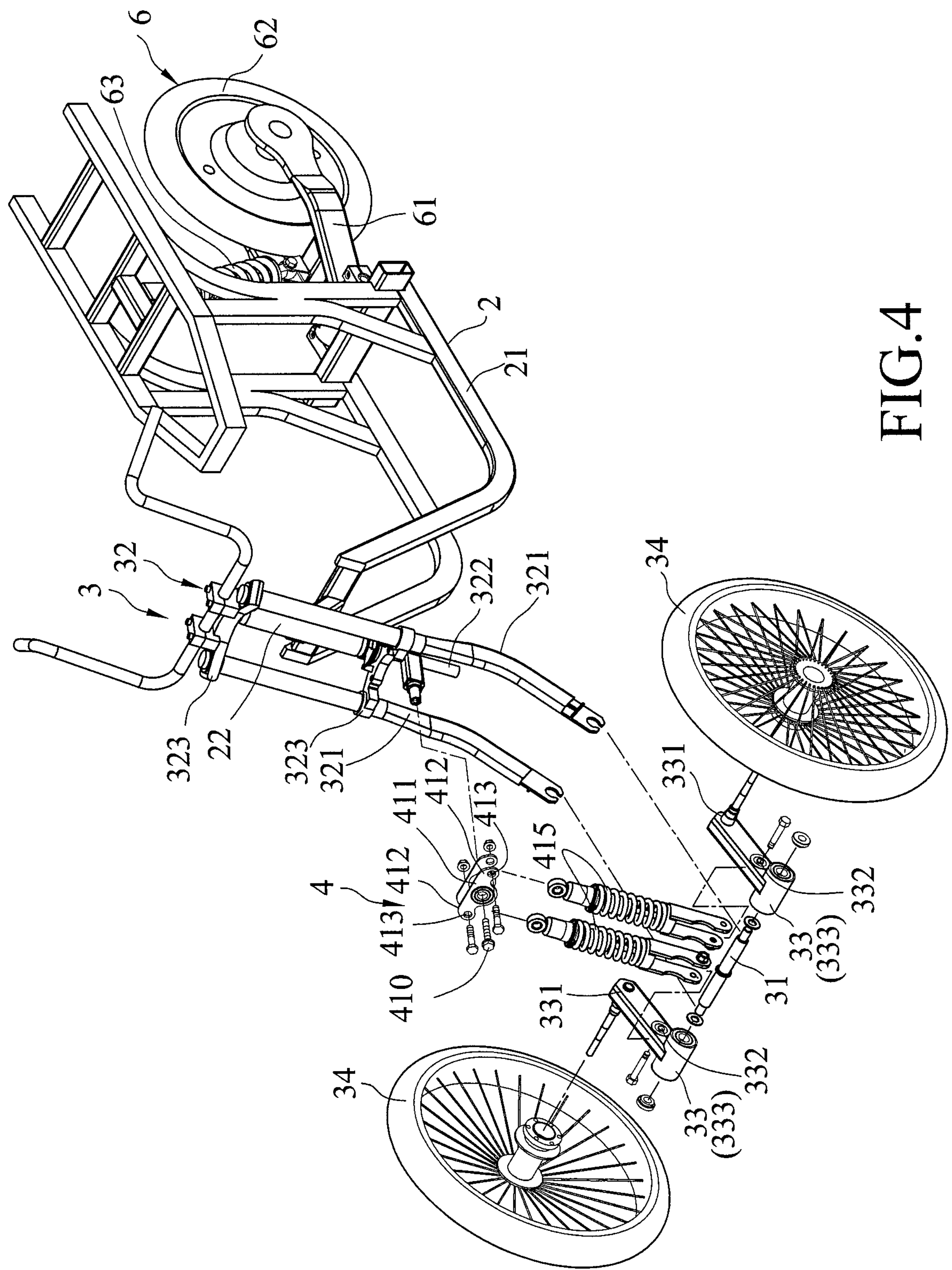
FIG. 4 is a partly-exploded perspective view of a third embodiment of the frame according to the disclosure.
Figure 5:
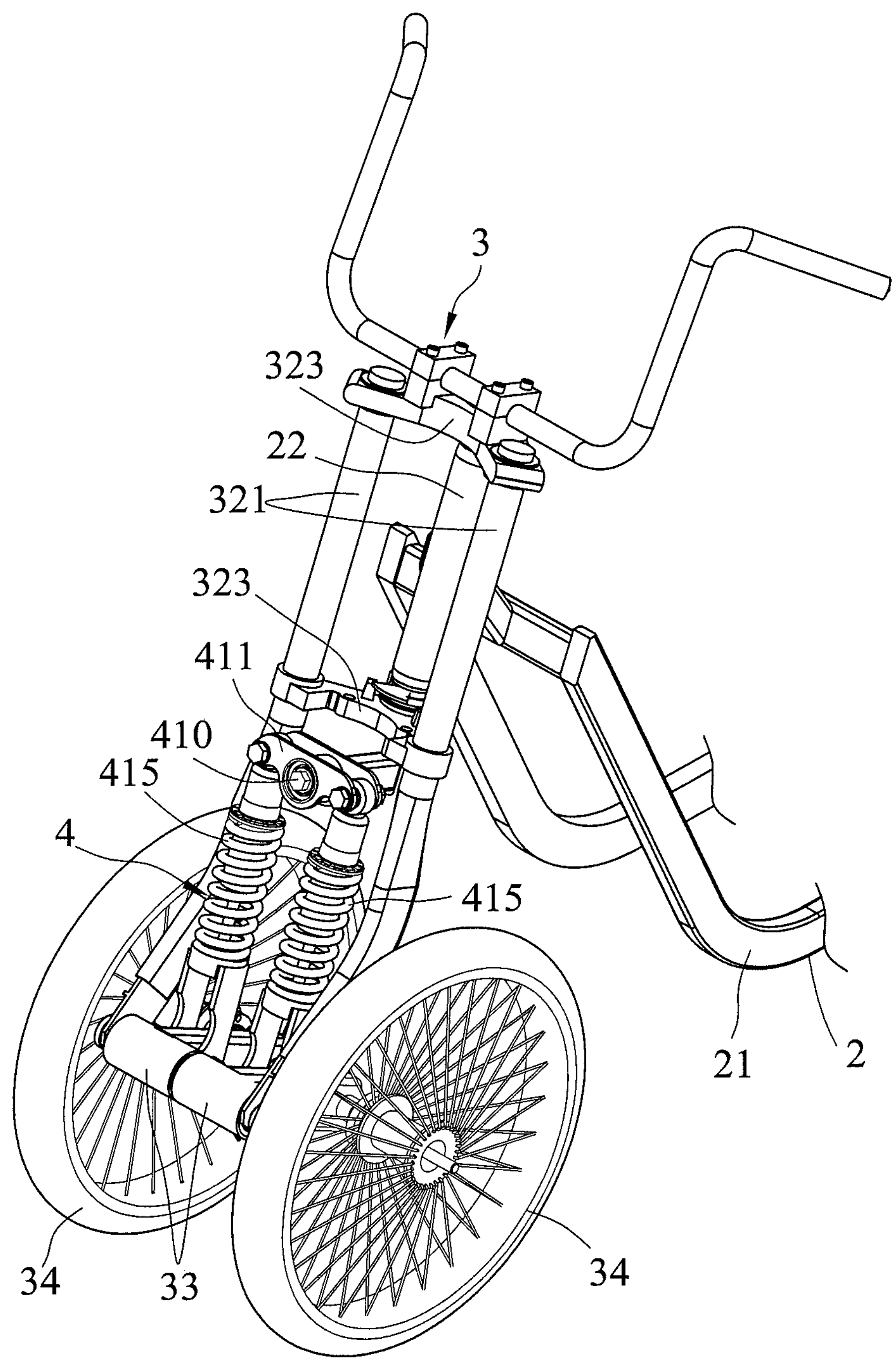
FIG. 5 is a fragmentary perspective view of the third embodiment.

Referring to FIGS. 4 and 5, in a third embodiment, the front fork unit 32 includes a front fork shaft 322 which extends in the upper-and-lower direction through the head tube 22 to be rotatable relative to the head tube 22 and to have upper and lower shaft ends, upper and lower brackets 323 which are respectively disposed on the upper and lower shaft ends of the front fork shaft 322 and each of which has left and right bracket ends, and two front fork tubes 321, one of which extends in the upper-and-lower direction through the left bracket ends of the upper and lower brackets 323 to have the lower fork end portion, and the other one of which extends in the upper-and-lower direction through the right bracket ends of the upper and lower brackets 323 to have the lower fork end portion. The crank axle 31 is disposed on the lower fork end portions of the front fork tubes 321 and below the lower bracket 323. The front-wheel cranks 33 are disposed inwardly of the lower fork end portions of the front fork tubes 321. The front-wheel counteracting mechanism 4 is pivotably connected between the front exerting force pivot point 332 of each front-wheel crank 33 and the front fork shaft 322.

Figure 6:
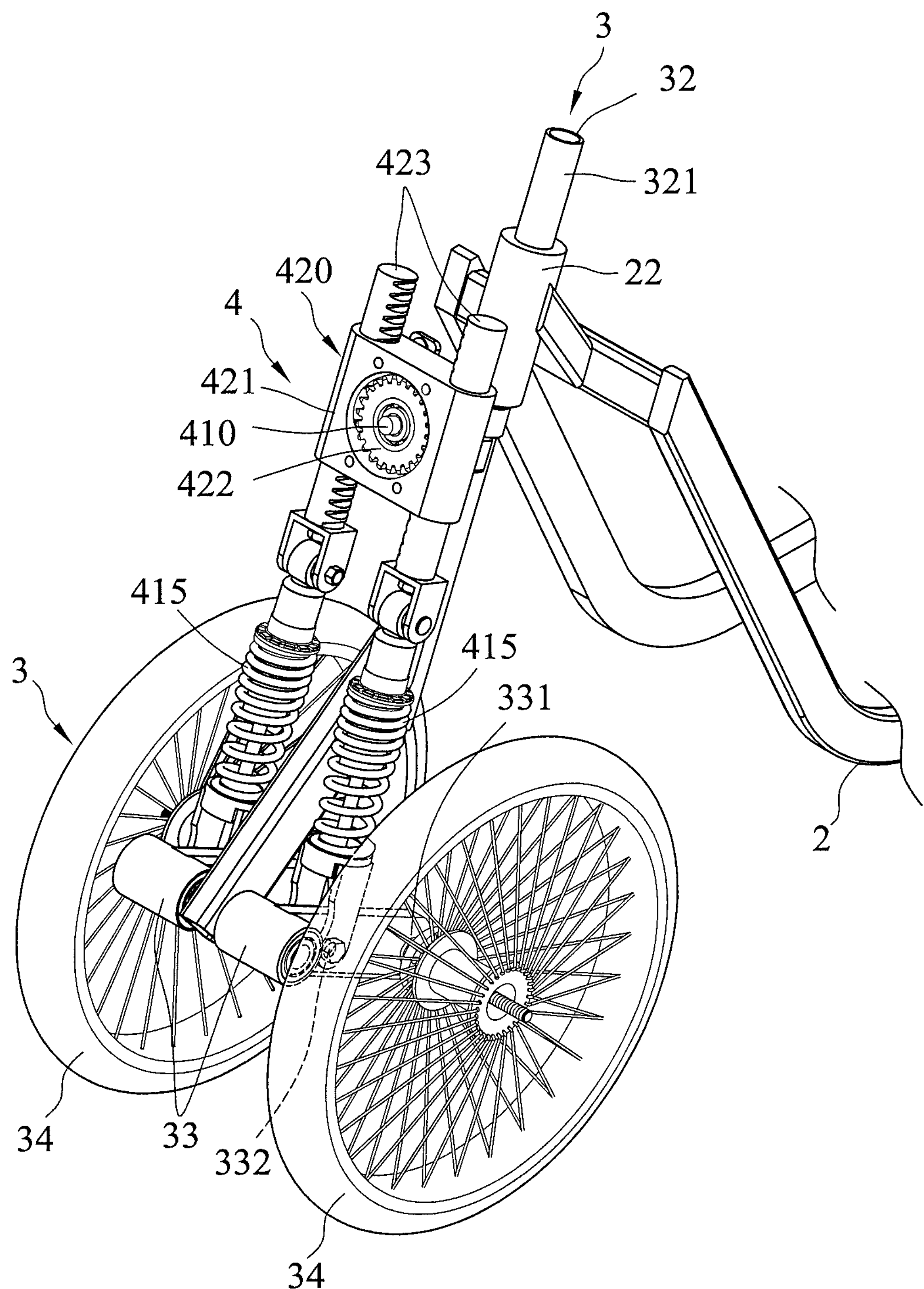
FIG. 6 is a fragmentary perspective view of a fourth embodiment of the frame according to the disclosure.
Figure 7:
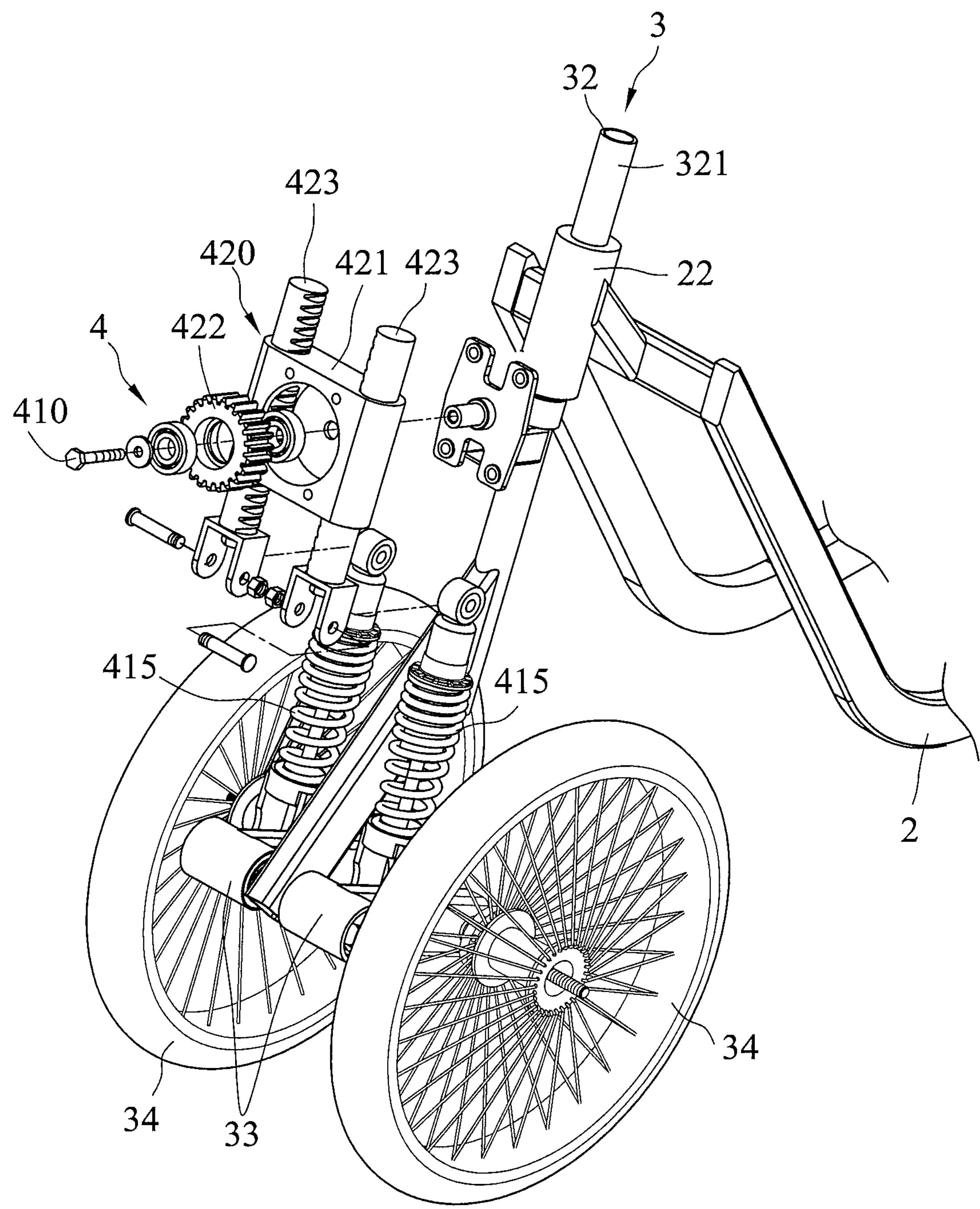
FIG. 7 is a fragmentary, partly-exploded perspective view of the fourth embodiment.

Referring to FIGS. 6 and 7, in a fourth embodiment, the front-wheel counteracting mechanism 4 includes a gearbox 420 having a box body 421 securely mounted on a front side of the front fork unit 32, and a gear 422 rotatably disposed in the box body 421, two racks 423 extending in the upper-and-lower direction, disposed at two diametrically opposite sides of the gear 422 and meshing with the gear 422 to be moved in opposite upward and downward movements with rotation of the gear 422, and two front damping members 415, each of which is pivotably connected to the front exerting force pivot point 332 of the respective front-wheel crank 33 and extends upwardly to be pivotably connected to a lower end of the respective rack 423.

With such construction, the lifted front wheel 34 moves the respective front damping member 415 upwardly through the respective front-wheel crank 33, and hence moves the respective rack 423 upwardly so as to cause rotation of the gear 422 and downward movement of the other rack 423.

At this time, the respective front-wheel crank 33 which corresponds in position to the other rack 423 is pressed downward through the respective front damping member 415 so as to move the respective front wheel 34 downward relative to the front fork unit 32 for keeping the vehicle body mechanism 2 balanced.

Figure 8:
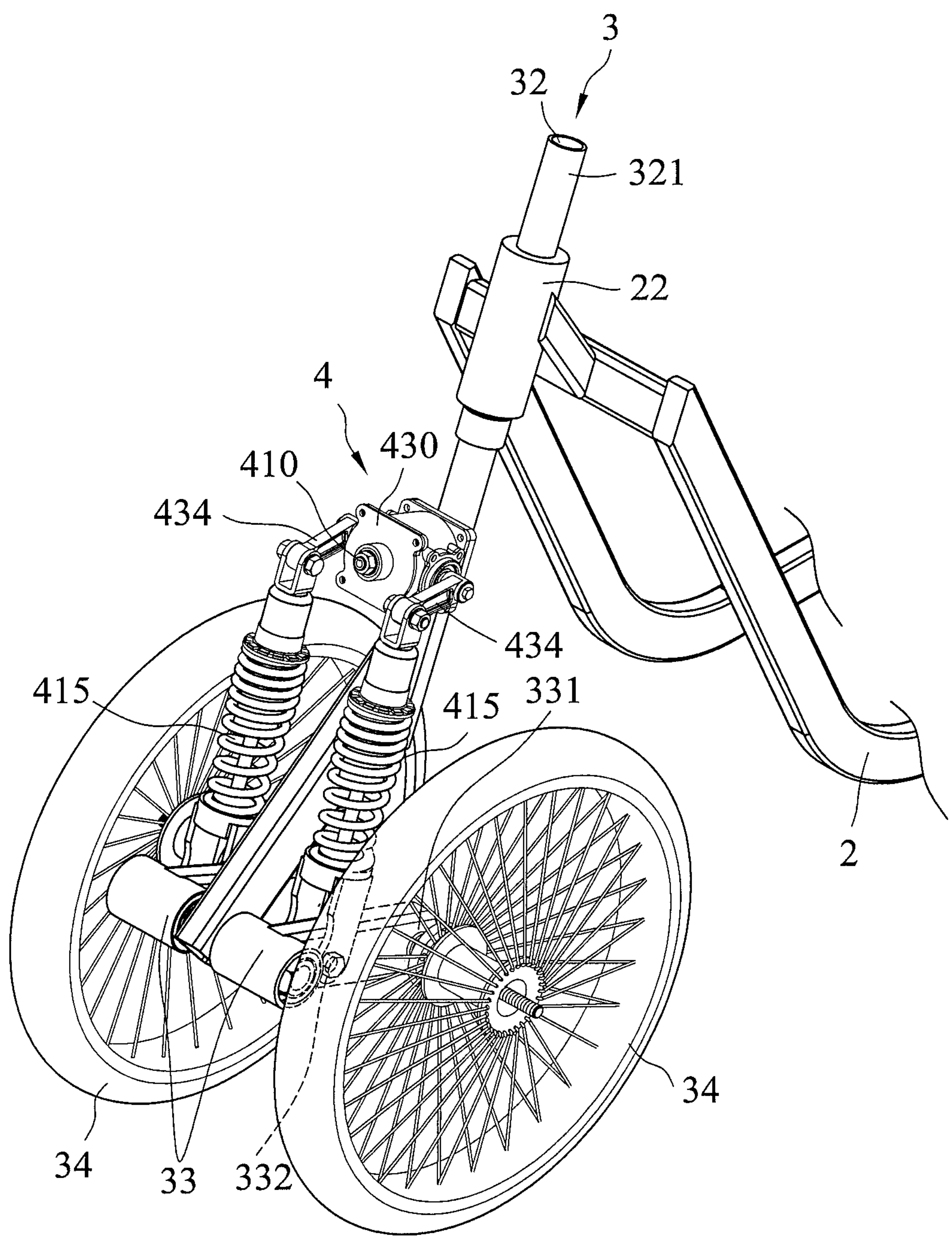
FIG. 8 is a fragmentary perspective view of a fifth embodiment of the frame according to the disclosure.
Figure 9:
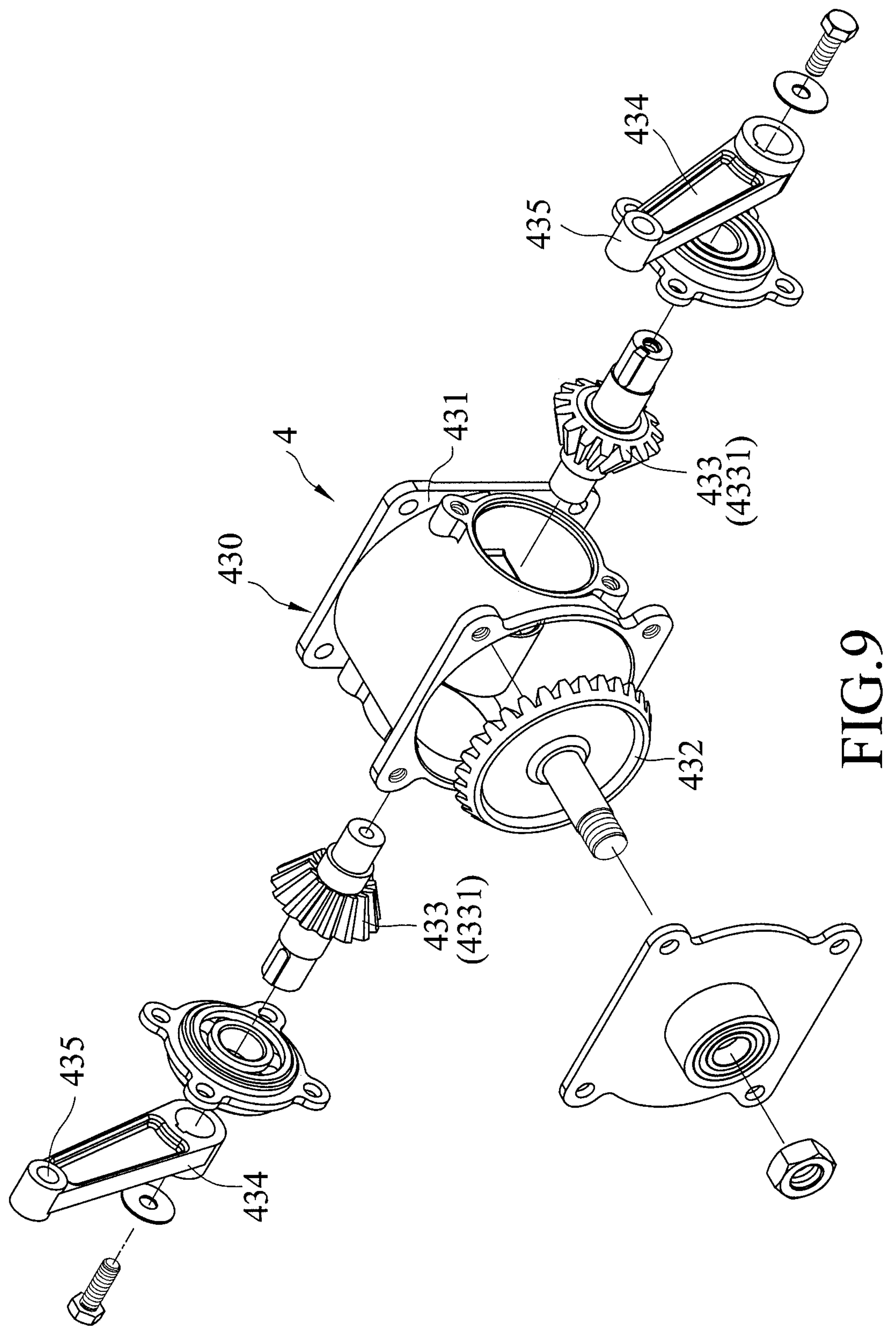
FIG. 9 is an exploded perspective view of a front-wheel counteracting mechanism of the fifth embodiment.

Referring to FIGS. 8 and 9, in a fifth embodiment, the front-wheel counteracting mechanism 4 includes a coaxial gearbox 430 mounted on the front fork unit 32, two counteracting cranks 434 respectively disposed at left and right sides of the coaxial gearbox 430, and two front damping members 415, each pivotably connected to the front exerting force pivot point 332 of the respective front-wheel crank 33 and extending upwardly to be pivotably connected to the respective counteracting crank 434.

The coaxial gearbox 430 has a box body 431 which is securely mounted on the front fork unit 32, an idle gear 432 which is rotatably disposed in the box body 431, and two front gear shafts 433 which are coaxially and pivotably disposed on the box body 431 and which respectively have bevel gear portions 4331 that mesh with the idle gear 432 so as to cause rotations of the front gear shafts 433 in opposite rotational directions.

Each counteracting crank 434 is securely connected with the respective front gear shaft 433 at a rear end portion thereof, and has a free end 435 that is swingable with the rotation of the respective front gear shaft 433 and that is pivotably connected to the respective front damping member 415 such that the rotations of the front gear shafts 433 in the opposite rotational directions through the idle gear 432 result in upward and downward movements of the free ends 435 of the counteracting cranks 434.

When one of the front wheels 34 is lifted by passing over a bump on the ground, the front-wheel crank 33, the front damping member 415 and the counteracting crank 434 at this lifted side are moved to transmit an impact force to the coaxial gearbox 430 and to rotate the other front gear shaft 433 so as to cause pivoting movement of the other counteracting crank 434. The front damping member 415 and the front-wheel crank 33 at the other side are pressed downwardly to move the respective front wheel 34 downward such that the front wheels 34 can be kept steady and in contact with the ground with a good grip to render the vehicle steady and balanced in the left-and-right direction.

Figure 10:
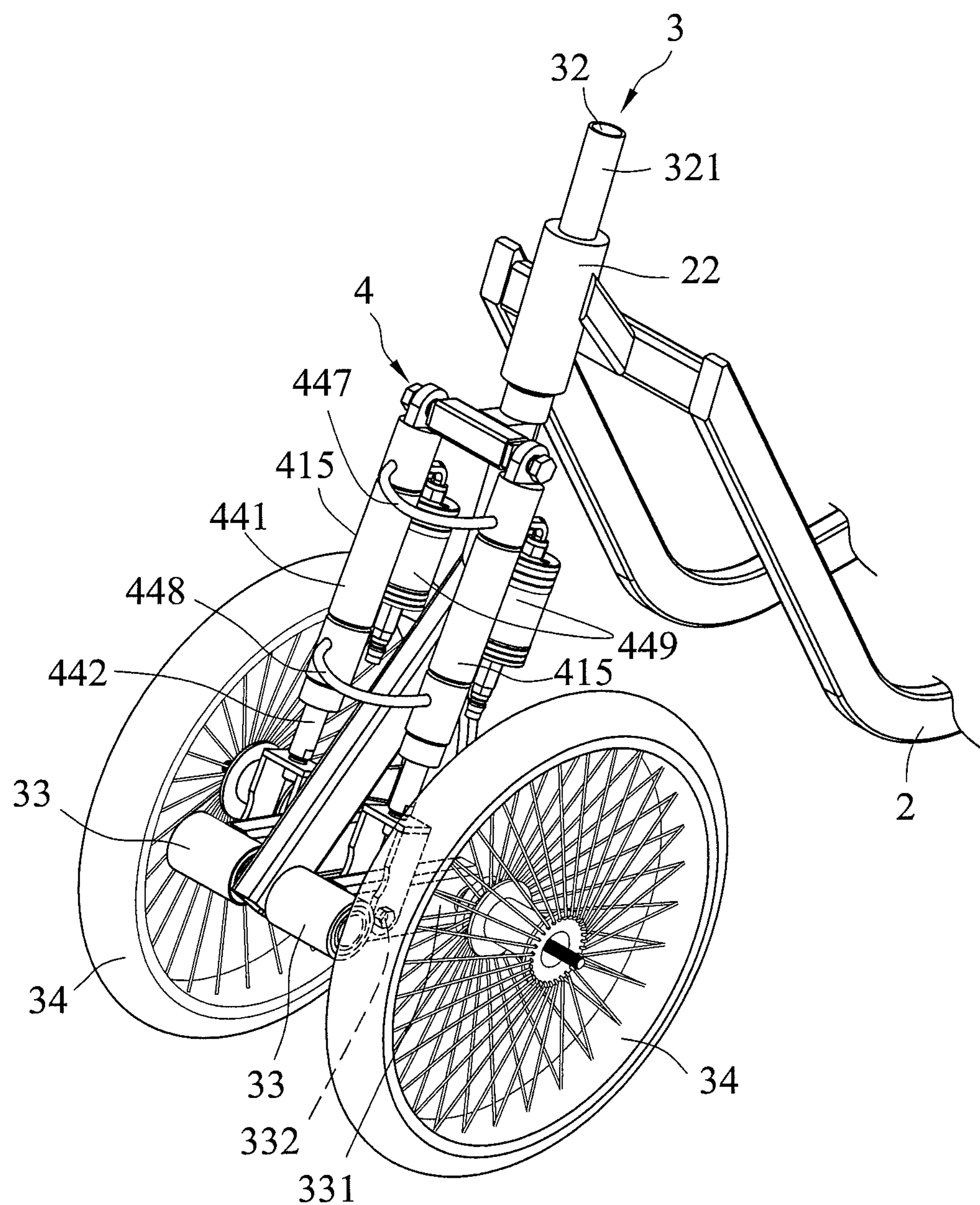
FIG. 10 is a fragmentary perspective view of a sixth embodiment of the frame according to the disclosure.
Figure 11:
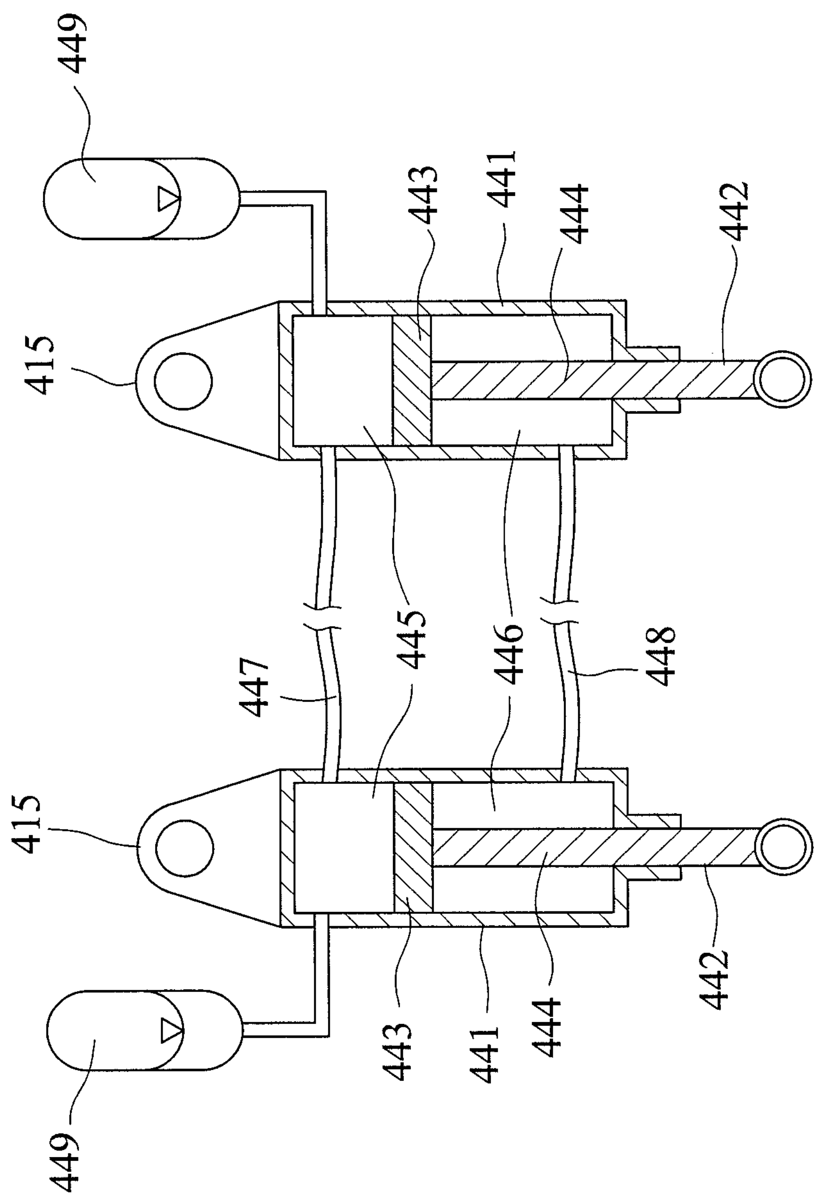
FIG. 11 is a schematic sectional view of a front-wheel counteracting mechanism of the sixth embodiment.

Referring to FIGS. 10 and 11, in a sixth embodiment, the front-wheel counteracting mechanism 4 includes two front damping members 415 each of which is pivotably connected to the front exerting force pivot point 332 of the respective front-wheel crank 33 and extends upwardly to be pivotably connected to the front fork unit 32, upper and lower fluid pipes 447, 448 each of which is connected between and in fluid communication with the front damping members 415, and two pressure storing members 449 which are respectively connected to and in fluid communication with the front damping members 415.

In this embodiment, each front damping member 415 is a known piston-type hydraulic cylinder, and includes a cylinder 441 which is pivotably connected to the front fork unit 32 and which extends downwardly, and a piston 442 which has a disk segment 443 that is slidably disposed in the cylinder 441 to partition an inner space of the cylinder 441 into an upper fluid chamber 445 and a lower fluid chamber 446, and a rod segment 444 that extends downwardly through the cylinder 441 to be pivotably connected to the front exerting force pivot point 332 of the respective front-wheel crank 33. The upper fluid pipe 447 is in communication between the upper fluid chambers 445. The lower fluid pipe 448 is in communication between the lower fluid chambers 446. The pressure storing members 449 are respectively in fluid communication with the upper fluid chambers 445.

One of the pistons 442 is retreated upwardly by an impact force to decrease the volume of the upper fluid chamber 445 so as to permit fluid to flow to the other upper fluid chamber 445 through the upper fluid pipe 447, and to generate a back pressure in the lower fluid chamber 446 so as to permit fluid to flow thereinto from the other lower fluid chamber 446 through the lower fluid pipe 448.

At this time, the piston 442 at the other side is moved downwardly to compress the lower fluid chamber 446 to urge the fluid to flow toward the other lower fluid chamber 446, thereby making a pressure balance in the fluid chambers 445, 446 of the front damping members 415.

With such construction, when one of the front wheels 34 is lifted, the impact force can be transmitted to move the other front wheel 34 downwardly through the front counteracting mechanism 4 so as to keep the front wheels 34 steady and in contact with the ground with a good grip to render the vehicle steady and balanced in the left-and-right direction.

When both of the front wheels 34 are lifted when passing over a bump on the ground, an impact force applied to the front damping members 415 can be absorbed by the pressure storing members 449. Specifically, a pressure applied to the upper fluid chambers 445 due to depression of the pistons 442 can be absorbed by the pressure storing members 449 so as to reduce an impact to the front wheels 34, so that the front wheels 34 can pass over the bump smoothly. Moreover, when the front wheels 34 pass over a pit on the ground or run off the ground, by means of the pressure in the pressure storing members 449 to counteract gravity of the front wheels 34, sudden and severe outward expansion of the pistons 442 by the front-wheel cranks 33 can be avoided so as to prevent the front-wheel cranks 33 from falling to thereby permit the front wheels 34 to land smoothly.

In a various embodiment, only one pressure storing member 449 may be disposed to be connected to and in fluid communication with the upper fluid pipe 447, and can absorb an impact force applied to the front damping members 415.

Figure 12:
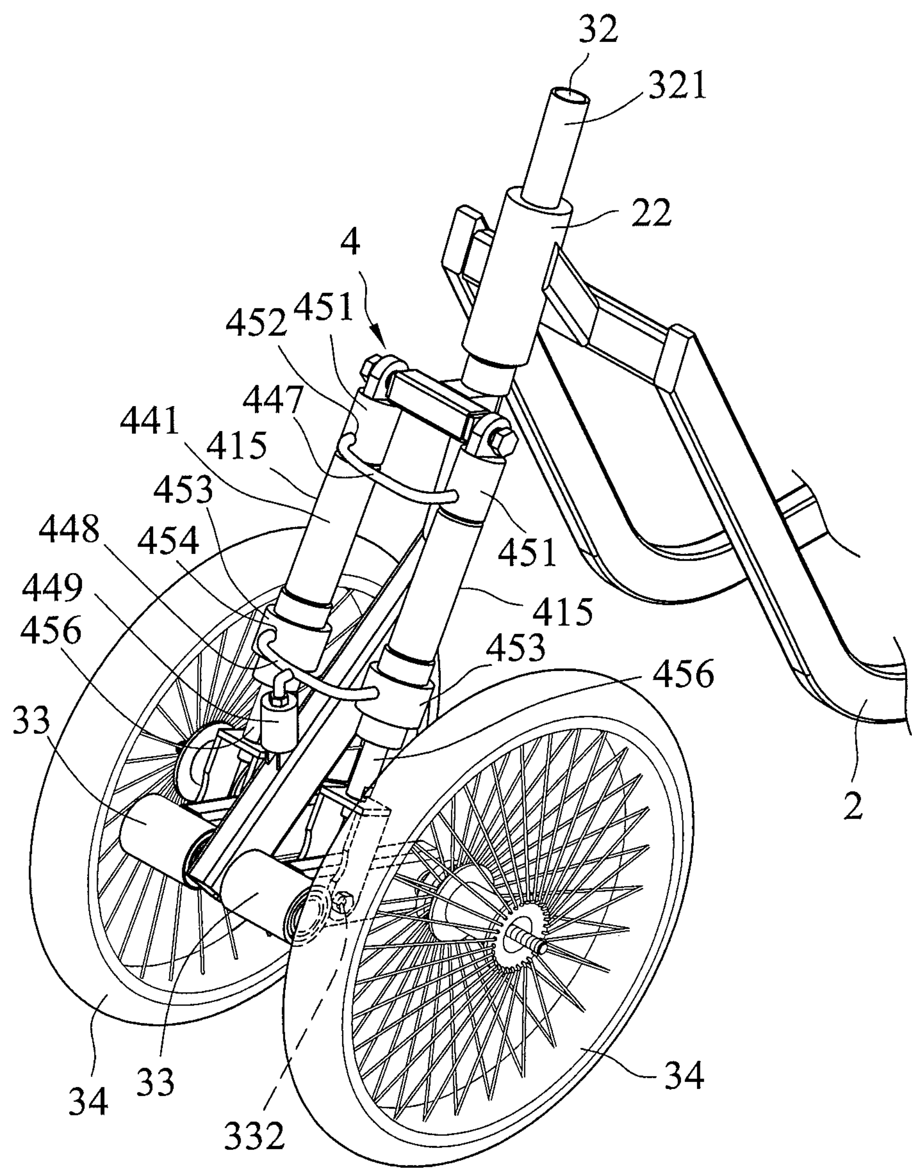
FIG. 12 is a fragmentary perspective view of a seventh embodiment of the frame according to the disclosure.
Figure 13:
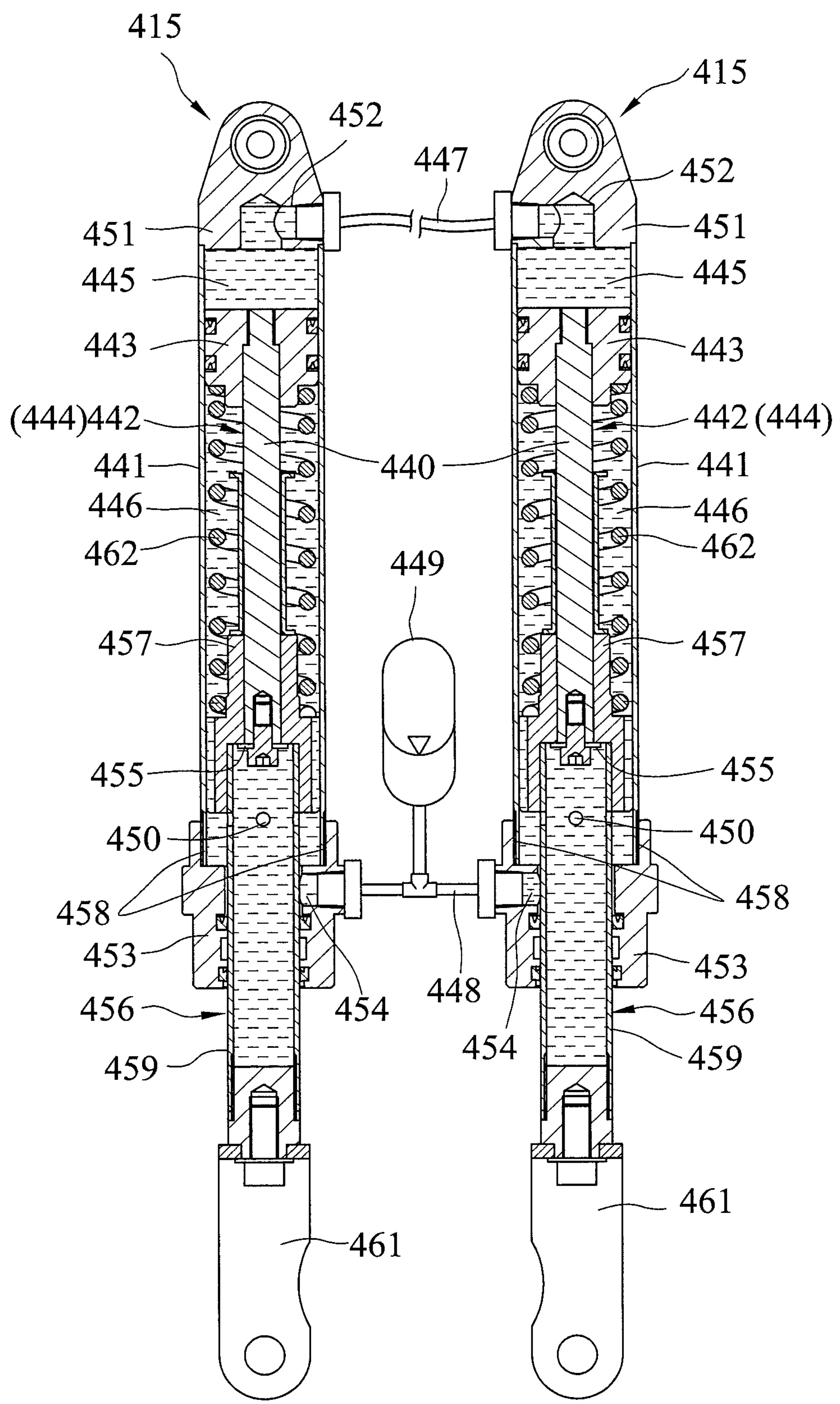
FIG. 13 is a partly-sectional view of a front-wheel counteracting mechanism of the seventh embodiment.

Referring to FIGS. 12 and 13, in a seventh embodiment, the front-wheel counteracting mechanism 4 includes two front damping members 415 each of which extends in the upper-and-lower direction and is pivotably connected between the respective front-wheel crank 33 and the front fork unit 32, upper and lower fluid pipes 447, 448 each of which is connected between and in fluid communication with the front damping members 415, and a pressure storing member 449 which is connected to and in fluid communication with the lower fluid pipe 448.

Each front damping member 415 includes a cylinder 441 which extends in the upper-and-lower direction to terminate at and to be enclosed by upper and lower end caps 451, 453, and a piston 442 which has a disk segment 443 that is slidably disposed in the cylinder 441 to partition an inner space of the cylinder 441 into an upper fluid chamber 445 and a lower fluid chamber 446, and a rod segment 444 that extends downwardly from the disk segment 443. The upper end cap 451 is pivotably connected to the front fork unit 32, and has an upper fluid hole 452 in fluid communication with the upper fluid chamber 445. The lower end cap 453 has a lower fluid hole 454 in fluid communication with the lower fluid chamber 446. The upper fluid pipe 447 is in communication between the upper fluid holes 452. The lower fluid pipe 448 is in communication between the lower fluid holes 454.

The rod segment 444 has an upper rod portion 440 which extends downwardly from the disk segment 443 to terminate at an enlarged shoulder 455, and a lower cylinder portion 456 which has a socket 457 that is movably sleeved on a lower portion of the upper rod portion 440 and that is configured to abut against the enlarged shoulder 455, and a tubular body 459 that is in fluid-tight engagement with the socket 457 at an upper end portion thereof, and that extends downwardly through the lower end cap 453 to terminate at a linking lug 461 for being pivotably connected to the respective front-wheel crank 33. A biasing spring 462 is disposed in the cylinder 441 and between the disk segment 443 and the socket 457. An outer surface of the socket 457 has elongated slots 458 for flowing of the fluid therethrough in the upper-and-lower direction. The tubular body 459 has a through hole 450 in fluid communication with the lower fluid chamber 446.

In operation, when both of the front wheels 34 are lifted, a lifting force is transmitted to the front damping members 415 through the front-wheel cranks 33. The disk segments 443 are not moved due to the same pressure in the upper fluid chambers 445, while the lower cylinder portions 456 are moved upwardly relative to the pistons 442 so as to compress the biasing springs 462. By means of the biasing action of the biasing springs 462, an impact force is absorbed. This shock-absorbing action can also be achieved when the two front wheels 34 pass over two bumps of different heights.

When one of the front wheels 34 is lifted, the lifted front wheel 34 presses the piston 442 of the respective front damping member 415 upwardly so as to move the piston 442 of the other front damping member 415 downwardly by the fluid pressure in the upper fluid chamber 445 to thereby cause downward pivoting movement of the front-wheel crank 33 and the front wheel 34 at the other side for balancing the vehicle.

When both of the front wheels 34 pass over a pit on the ground or run off the ground, by means of the fluid pressure in the pressure storing member 449 applied to the lower fluid chambers 446 to counteract gravity of the front wheels 34, sudden and severe outward expansion of the pistons 442 by the front-wheel cranks 33 can be avoided so as to prevent the front-wheel cranks 33 from falling to thereby permit the front wheels 34 to land smoothly.

Figure 14:
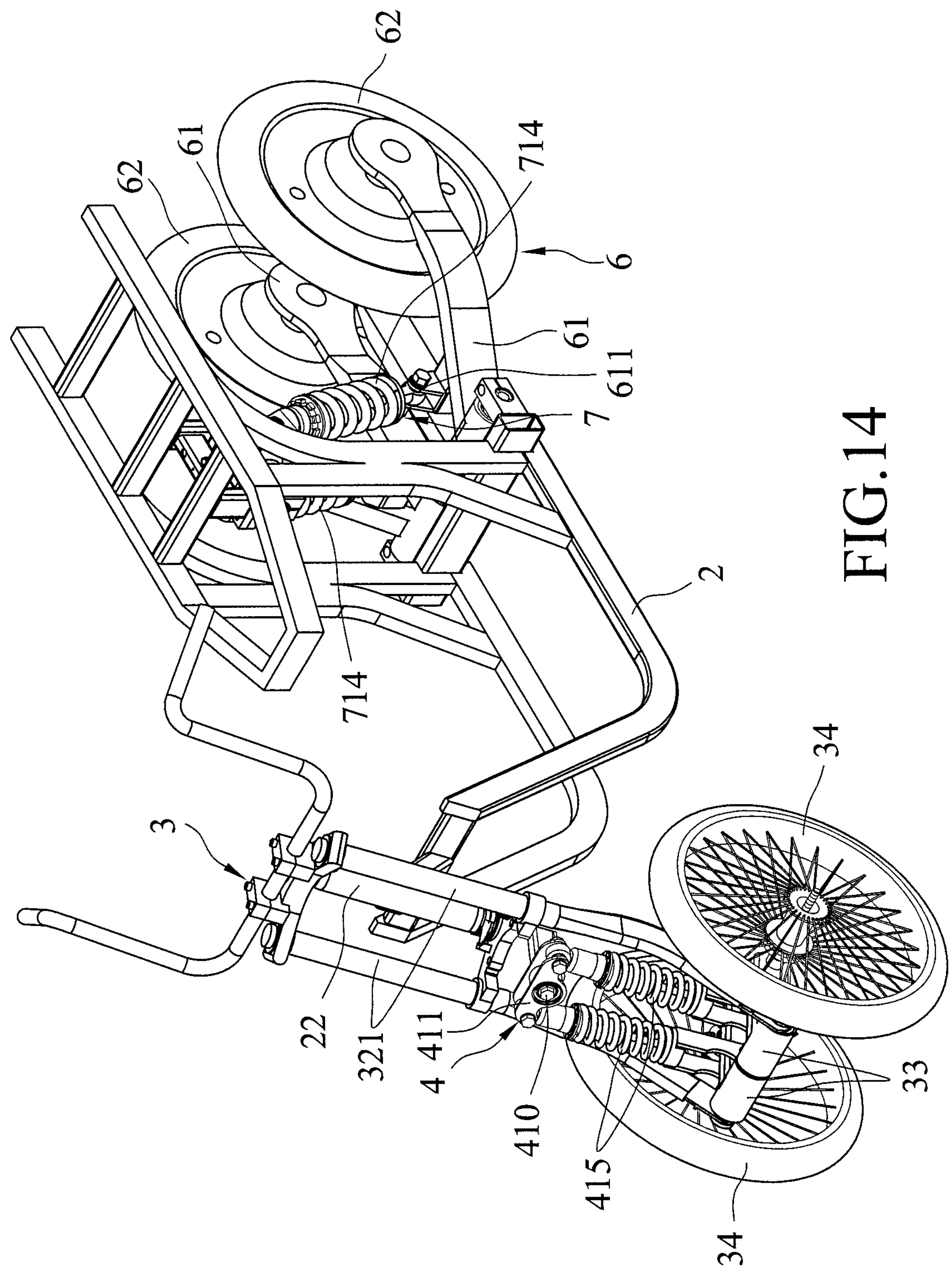
FIG. 14 is a perspective view of an eighth embodiment of the frame according to the disclosure.
Figure 15:
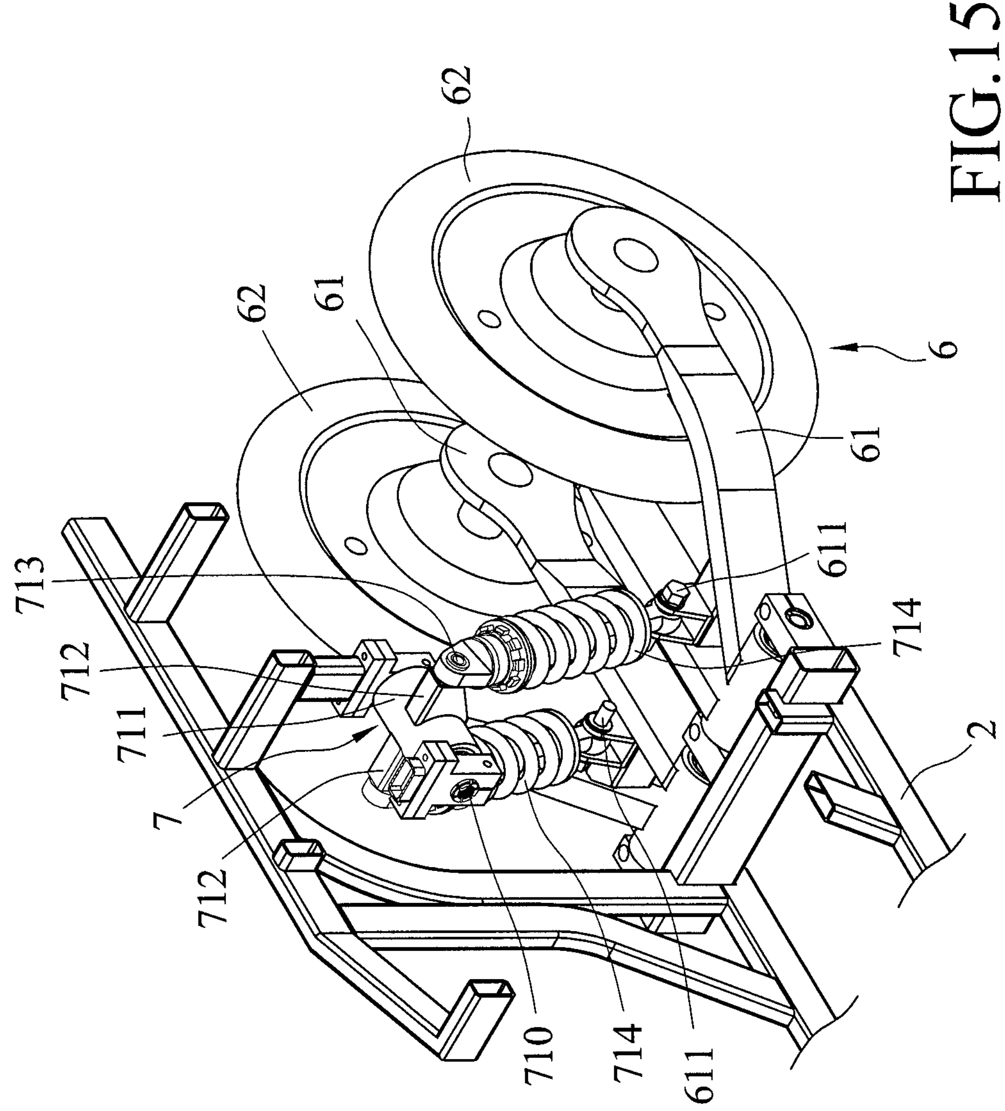
FIG. 15 is a fragmentary perspective view of the eighth embodiment.
Figure 16:
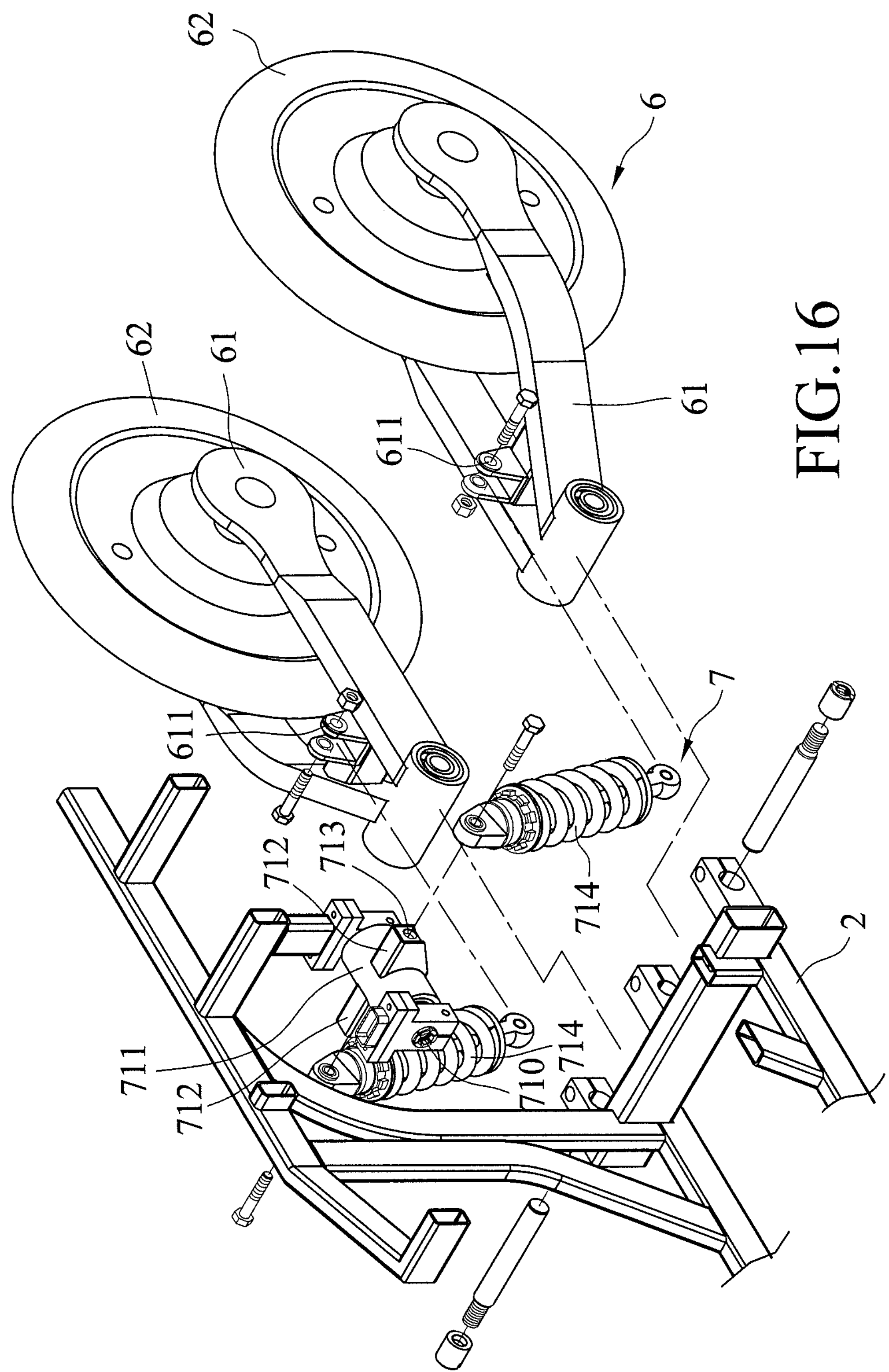
FIG. 16 is a fragmentary, partly-exploded perspective view of the eighth embodiment.

Referring to FIGS. 14 to 16, in an eighth embodiment, the frame is adapted to be provided with two front wheels 34 and two rear wheels 62 to be assembled as a quadricycle. The rear wheel frame mechanism 6 includes two rear wheel forks 61 which are coaxially and pivotably connected to a rear end portion of the vehicle body mechanism 2 to be rotatable relative to the vehicle body mechanism 2 about a pivot axis, which are spaced apart from each other in the left-and-right direction, and which extend rearwardly for the two rear wheels 62 to be rotatably mounted thereon about a rear wheel axis. Each of the rear wheel forks 61 has a rear exerting force pivot point 611 which is interposed between the pivot axis and the rear wheel axis.

The frame further includes a rear-wheel counteracting mechanism 7 which is pivotably connected between the rear exerting force pivot point 611 of each rear wheel fork 61 and the vehicle body mechanism 2, and which is configured to transmit upward and downward movements of the rear wheels 62, to absorb shocks happened onto the rear wheels, and to keep the rear wheels 62, while off the ground, in a proper position for retouching down.

Specifically, the rear-wheel counteracting mechanism 7 includes a central pivot axle 710 which extends in the front-and-rear direction from the vehicle body mechanism 2, a rear seesaw arm 711 which is pivotably disposed on the central pivot axle 710 at a middle portion thereof and which has left and right arm ends 712, and two rear damping members 714, each of which is pivotably connected to the rear exerting force pivot point 611 of the respective rear wheel fork 61 and extends upwardly to be pivotably connected to a respective one of the left and right arm ends 712 of the rear seesaw arm 711. In this embodiment, each of the rear damping members 714 is a spring shock absorber with hydraulic damper.

The left and right arm ends 712 of the rear seesaw arm 711 respectively have pivot points 713 at which the rear damping members 714 are respectively and pivotably connected. The distance between a connecting line of the pivot points 713 and a center of the central pivot axle 710 is no restriction. In this embodiment, each pivot point 713 is higher than the center of the central pivot axle 710.

Since the operation and function of the rear-wheel counteracting mechanism 7 are similar to those of the front-wheel counteracting mechanism 4 mentioned in the previous embodiments, a description thereof is dispensed with herein for the sake of brevity. By virtue of the rear-wheel counteracting mechanism 7 and the front-wheel counteracting mechanism 4, the steadiness and safety of the frame of the quadricycle are enhanced.

Figure 17:
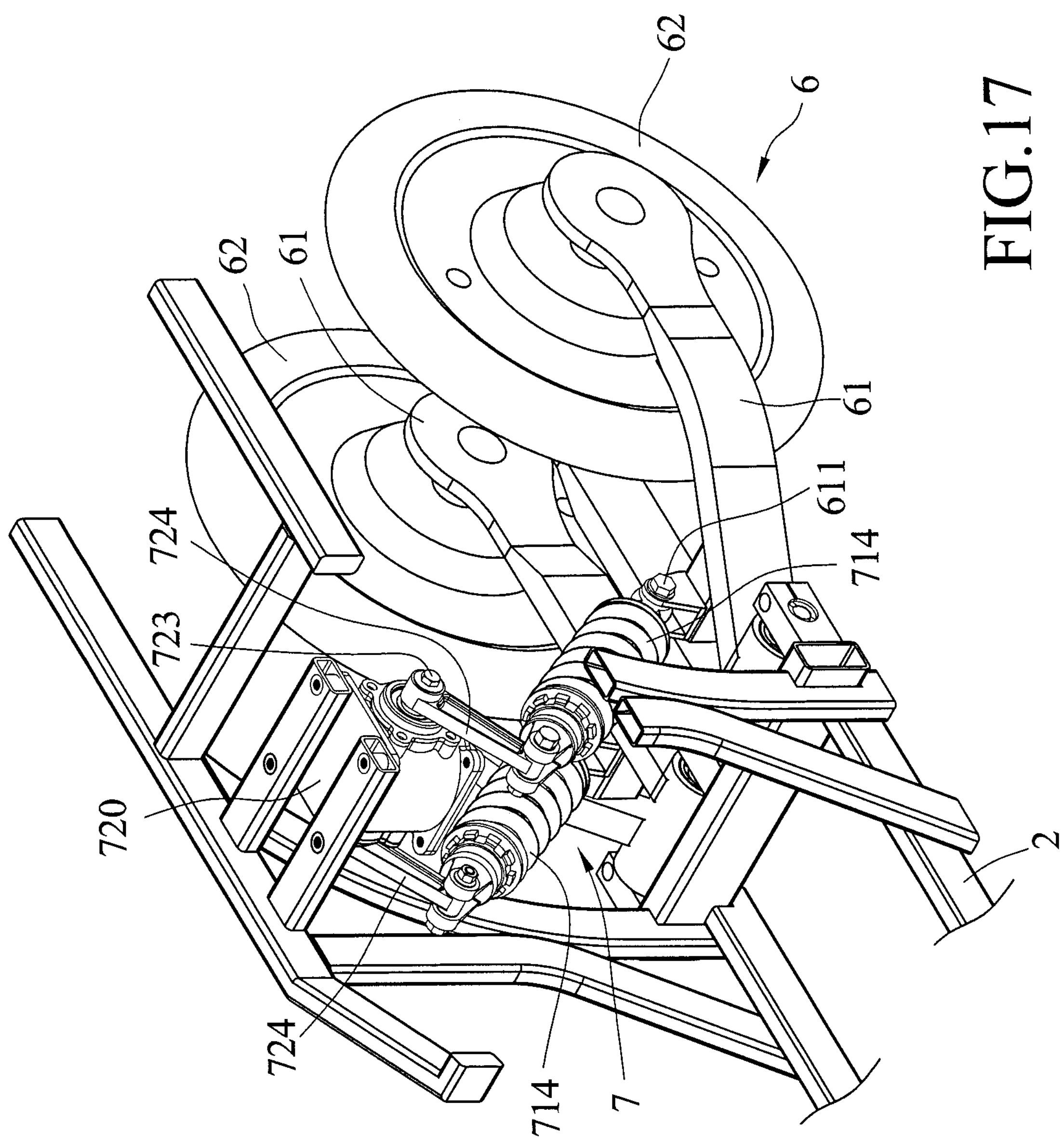
FIG. 17 is a fragmentary perspective view of a ninth embodiment of the frame according to the disclosure.
Figure 18:
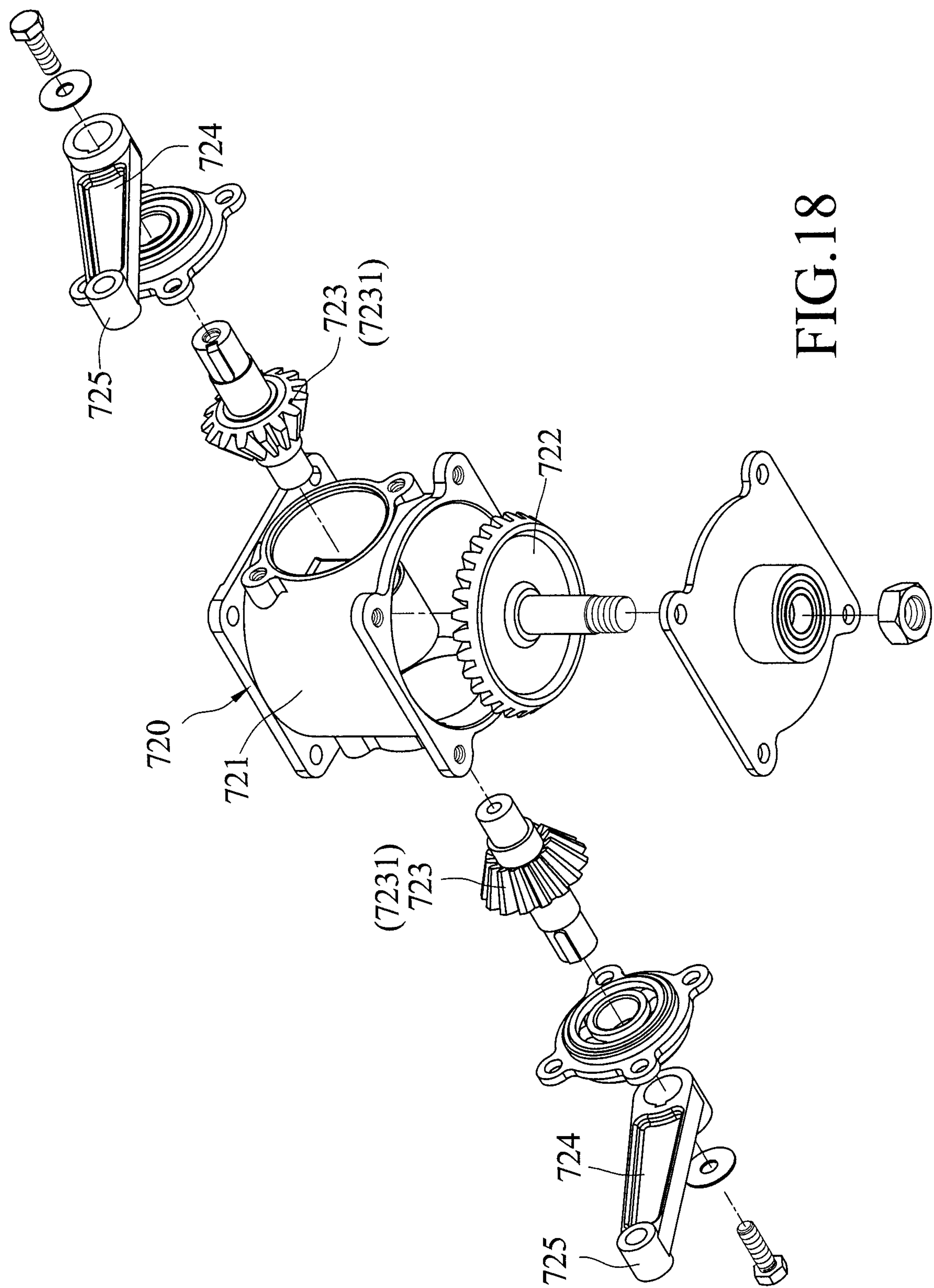
FIG. 18 is an exploded perspective view of a rear-wheel counteracting mechanism of the ninth embodiment.

Referring to FIGS. 17 and 18, in a ninth embodiment, the rear wheel frame mechanism 6 has the same construction as that of the previous eighth embodiment.

The rear-wheel counteracting mechanism 7 includes a coaxial gearbox 720 mounted on the vehicle body mechanism 2 and spacedly above the rear wheel forks 61, two counteracting cranks 724 respectively disposed at left and right sides of the coaxial gearbox 720, and two rear damping members 714, each pivotably connected to the rear exerting force pivot point 611 of the respective rear wheel fork 61 and extending upwardly to be pivotably connected to the respective counteracting cranks 724.

In this embodiment, each of the rear damping members 714 is a spring shock absorber with hydraulic damper.

The coaxial gearbox 720 has a box body 721 which is securely mounted on the vehicle body mechanism 2, an idle gear 722 which is rotatably disposed in the box body 721, and two rear gear shafts 723 which are coaxially and pivotably disposed on the box body 721 and which respectively have bevel gear portions 7231 that mesh with the idle gear 722 so as to cause rotations of the rear gear shafts 723 in opposite rotational directions. Each of the counteracting cranks 724 is securely connected with the respective rear gear shafts 723, and has a swing end 725 that is swingable with the rotation of the respective rear gear shaft 723 and that is pivotably connected to the respective rear damping member 714, such that rotations of the rear gear shafts 723 in opposite rotational directions through the idle gear 722 result in upward and downward movements of the swing ends 725 of the counteracting cranks 724.

When one of the rear wheels 62 is lifted when passing over a bump on the ground, the respective rear damping member 714 at this lifted side is pressed upwardly through the respective rear wheel fork 61 to transmit a force to the coaxial gearbox 720 and to swing the counteracting crank 724 at the other side downwardly so as to make a downward pivoting movement of the rear wheel 62 at the other side. Thus, the rear wheels 62 can be kept steady and in contact with the ground with a good grip.

Furthermore, by the action of the front-wheel counteracting mechanism 4, the steadiness and safety of the motorized quadricycle are enhanced.

Figure 19:
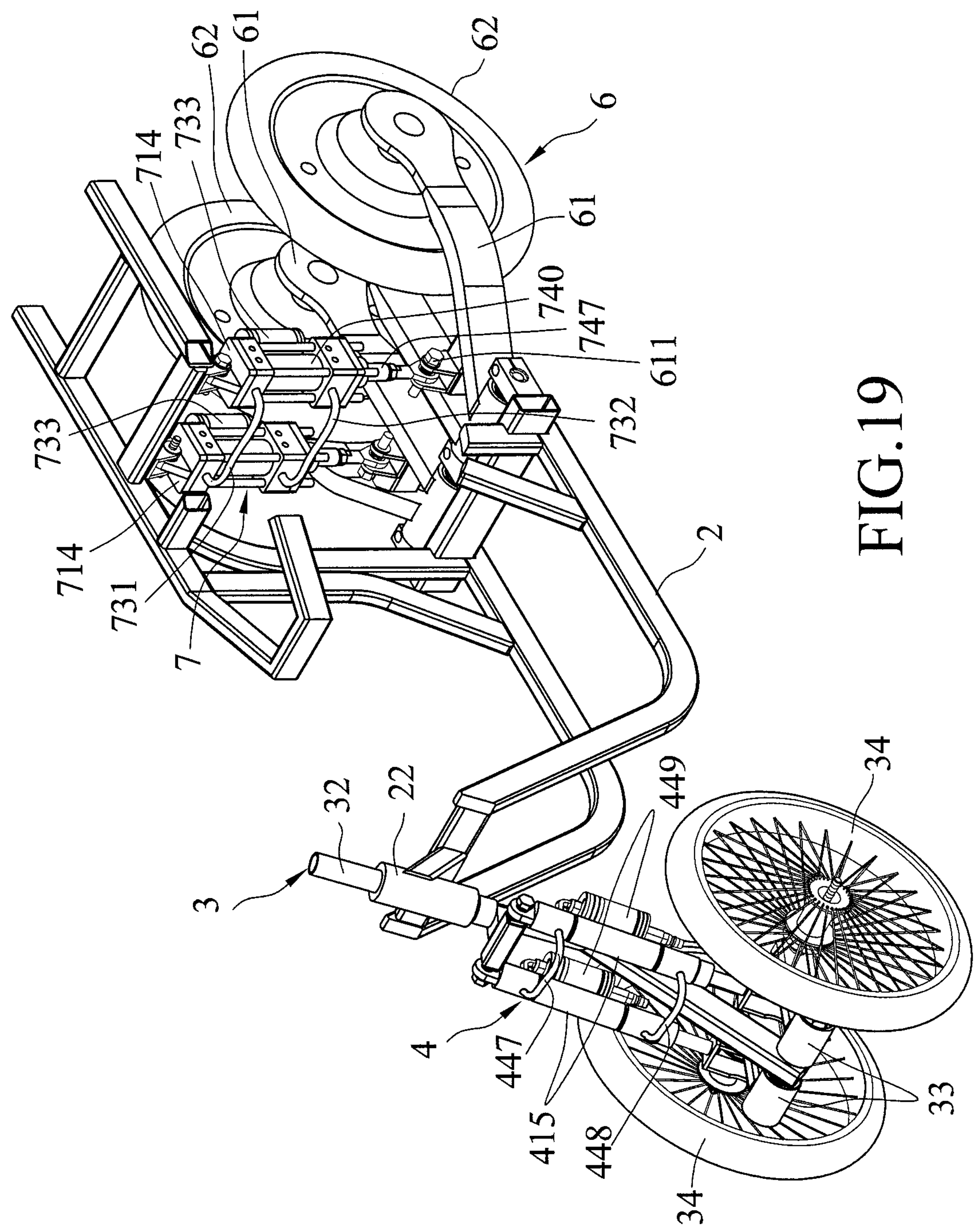
FIG. 19 is a perspective view of a tenth embodiment of the frame according to the disclosure.

Referring to FIG. 19, in a tenth embodiment, the rear wheel frame mechanism 6 has the same construction as that of the previous eighth embodiment.

The rear-wheel counteracting mechanism 7 includes two rear damping members 714 each of which is pivotably connected to the rear exerting force pivot point 611 of the respective rear wheel fork 61 and extends upwardly to be pivotably connected to the vehicle body mechanism 2, upper and lower fluid pipes 731, 732 each of which is connected between and in fluid communication with the rear damping members 714, and two pressure storing members 733 which are respectively connected to and in fluid communication with the front damping members 714. Since the structural relationship among the rear damping members 714, the upper and lower fluid pipes 731, 732 and the pressure storing members 733 are similar to that of the front damping members 415, the upper and lower fluid pipes 447, 448 and the pressure storing members 449 in the previous sixth embodiment, a description thereof is dispensed with herein for the sake of brevity.

The operation and function of the rear-wheel counteracting mechanism 7 are similar to those of the front-wheel counteracting mechanism 4. Likewise, when one rear wheel 62 is lifted, the other rear wheel 62 is transmitted to be moved downward so as to keep the rear wheels 62 steady and in contact with the ground. When both of the rear wheels 62 are lifted, an impact force applied to the rear damping members 714 can be absorbed by the pressure storing members 733. Moreover, when the rear wheels 62 pass over a pit on the ground or run off the ground, by means of the pressure in the pressure storing members 733 to counteract gravity of the rear wheels 62, a sudden falling movement of the rear wheel forks 61 can be avoided so as to permit the rear wheels 62 to land smoothly.

Figure 20:
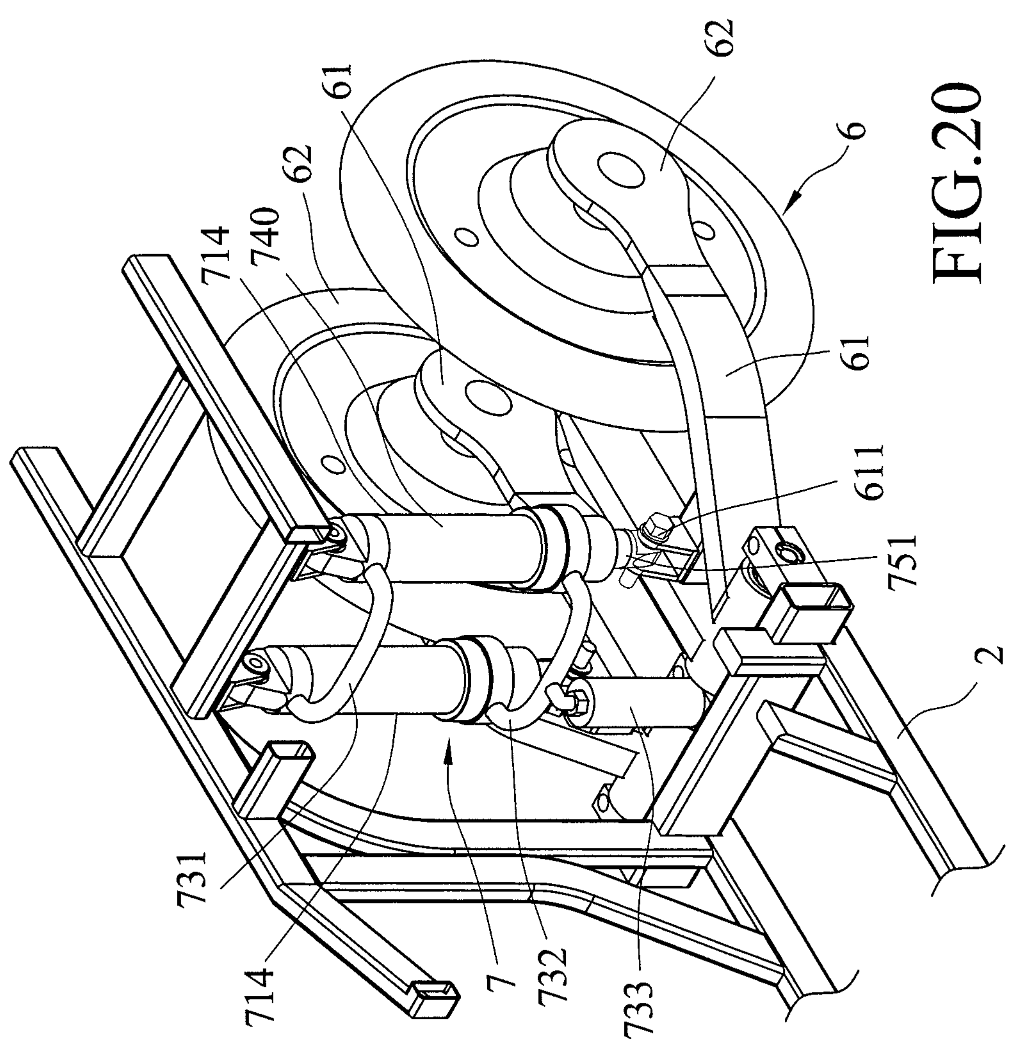
FIG. 20 is a fragmentary perspective view of an eleventh embodiment of the frame according to the disclosure.
Figure 21:
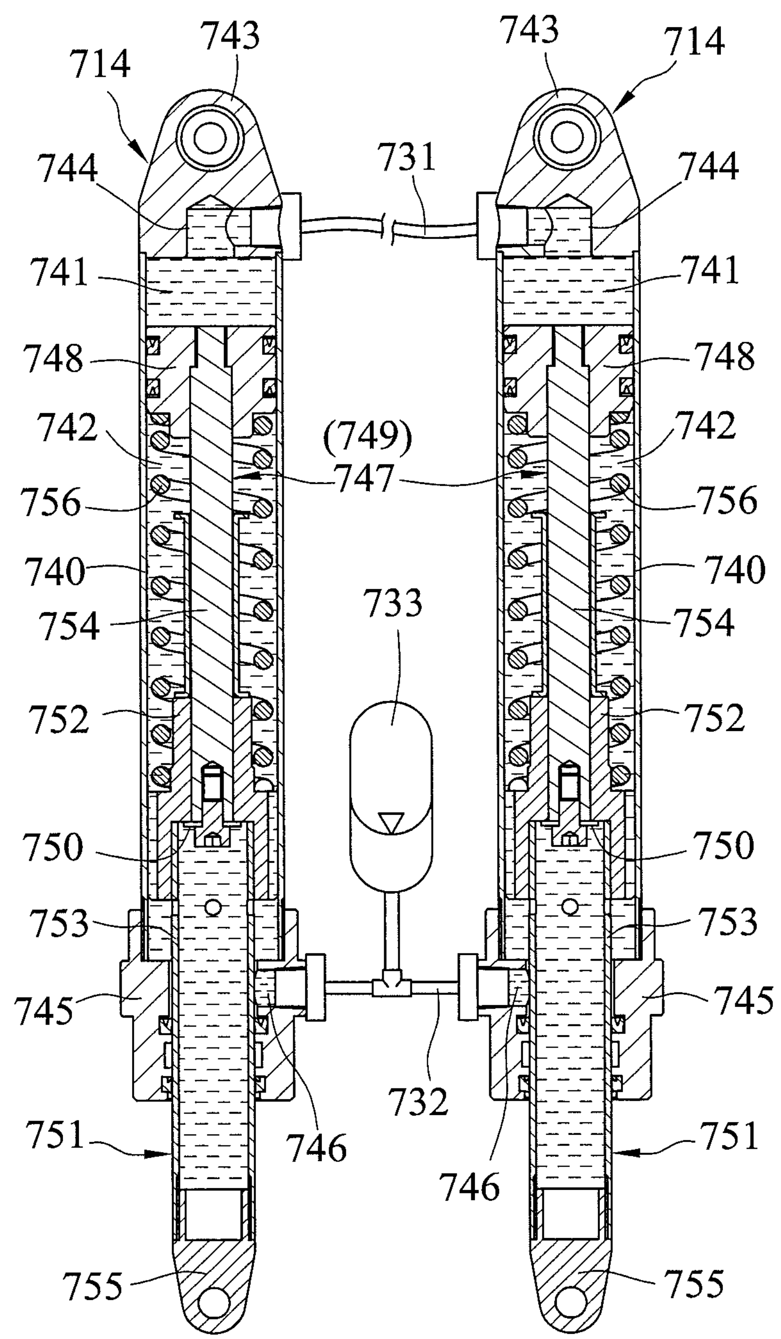
FIG. 21 is a fragmentary, sectional view of a rear-wheel counteracting mechanism of the eleventh embodiment.

Referring to FIGS. 20 and 21, in an eleventh embodiment, the rear wheel frame mechanism 6 has the same construction as that of the previous eighth embodiment.

The rear-wheel counteracting mechanism 7 includes two rear damping members 714 each of which is pivotably connected to the rear exerting force pivot point 611 of the respective rear wheel fork 61 and extends upwardly to be pivotably connected to the vehicle body mechanism 2, upper and lower fluid pipes 731, 732 each of which is connected between and in fluid communication with the rear damping members 714, and a pressure storing member 733 which is connected to and in fluid communication with the lower fluid pipe 732.

Each rear damping member 714 has a construction similar to that of the front damping member 415 in the previous seventh embodiment, and includes a cylinder 740 which extends in the upper-and-lower direction to terminate at and to be enclosed by upper and lower end caps 743, 745, and a piston 747 which has a disk segment 748 that is slidably disposed in the cylinder 740 to partition an inner space of the cylinder 740 into an upper fluid chamber 741 and a lower fluid chamber 742, and a rod segment 749 that extends downwardly from the disk segment 442. The upper end cap 743 is pivotably connected to the vehicle body mechanism 2, and has an upper fluid hole 744 in fluid communication with the upper fluid chamber 741. The lower end cap 745 has a lower fluid hole 746 in fluid communication with the lower fluid chamber 742. The upper fluid pipe 731 is in communication between the upper fluid holes 744. The lower fluid pipe 732 is in communication between the lower fluid holes 746.

The rod segment 749 has an upper rod portion 754 which extends downwardly from the disk segment 748 to terminate at an enlarged shoulder 750, and a lower cylinder portion 751 which has a socket 752 that is movably sleeved on a lower portion of the upper rod portion 754 and that is configured to abut against the enlarged shoulder 750, and a tubular body 753 that is in fluid-tight engagement with the socket 752 at an upper end portion thereof and that extends downwardly through the lower end cap 745 to terminate at a linking lug 755 for being pivotably connected to the rear exerting force pivot point 611 of the respective rear wheel fork 61. A biasing spring 756 is disposed in the lower fluid chamber 742 and between the disk segment 748 and the socket 752 so as to bias the lower cylinder portion 751 to move away from the disk segment 748.

Similarly, when one rear wheel 62 is lifted, the other rear wheel 62 is transmitted to be moved downward so as to keep the rear wheels 62 steady and in contact with the ground. When both of the rear wheels 62 are lifted, an impact force applied to the rear damping members 714 can be absorbed by the pressure storing member 733.

Moreover, when the rear wheels 62 pass over a pit on the ground or run off the ground, by means of the pressure in the pressure storing member 733 to counteract gravity of the rear wheels 62, a sudden falling movement of the rear wheel forks 61 can be avoided so as to permit the rear wheels 62 to land smoothly.

Figure 22:
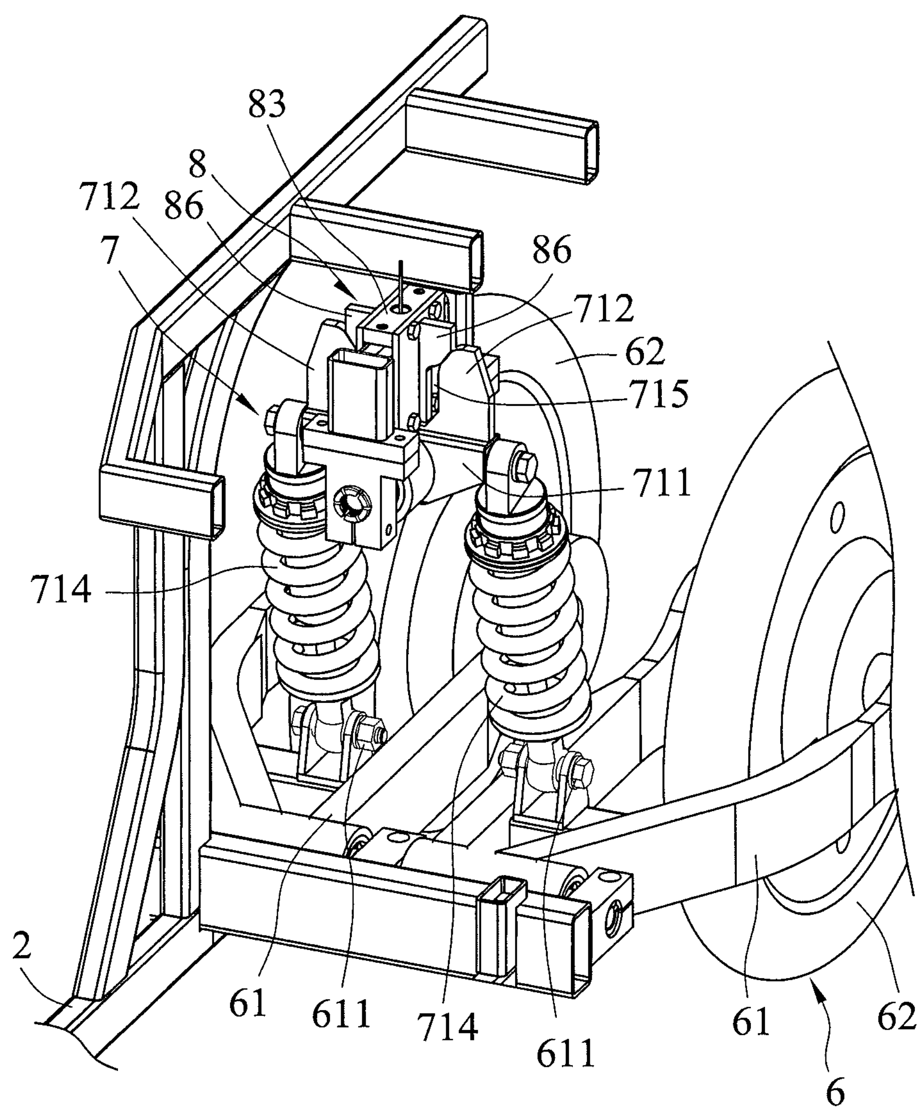
FIG. 22 is a fragmentary perspective view of a twelfth embodiment of the frame according to the disclosure, illustrating a state when a retaining mechanism is in a retaining position.
Figure 23:
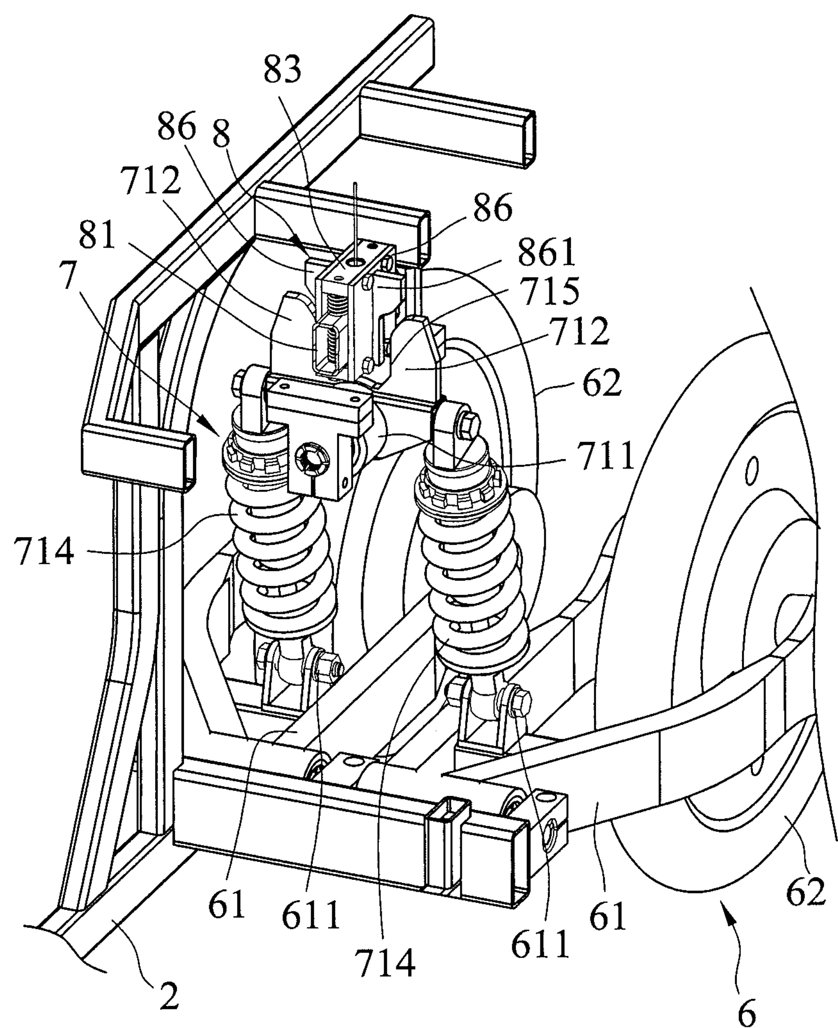
FIG. 23 is a view similar to FIG. 22, but illustrating a state when the retaining mechanism is in a releasing position.
Figure 24:
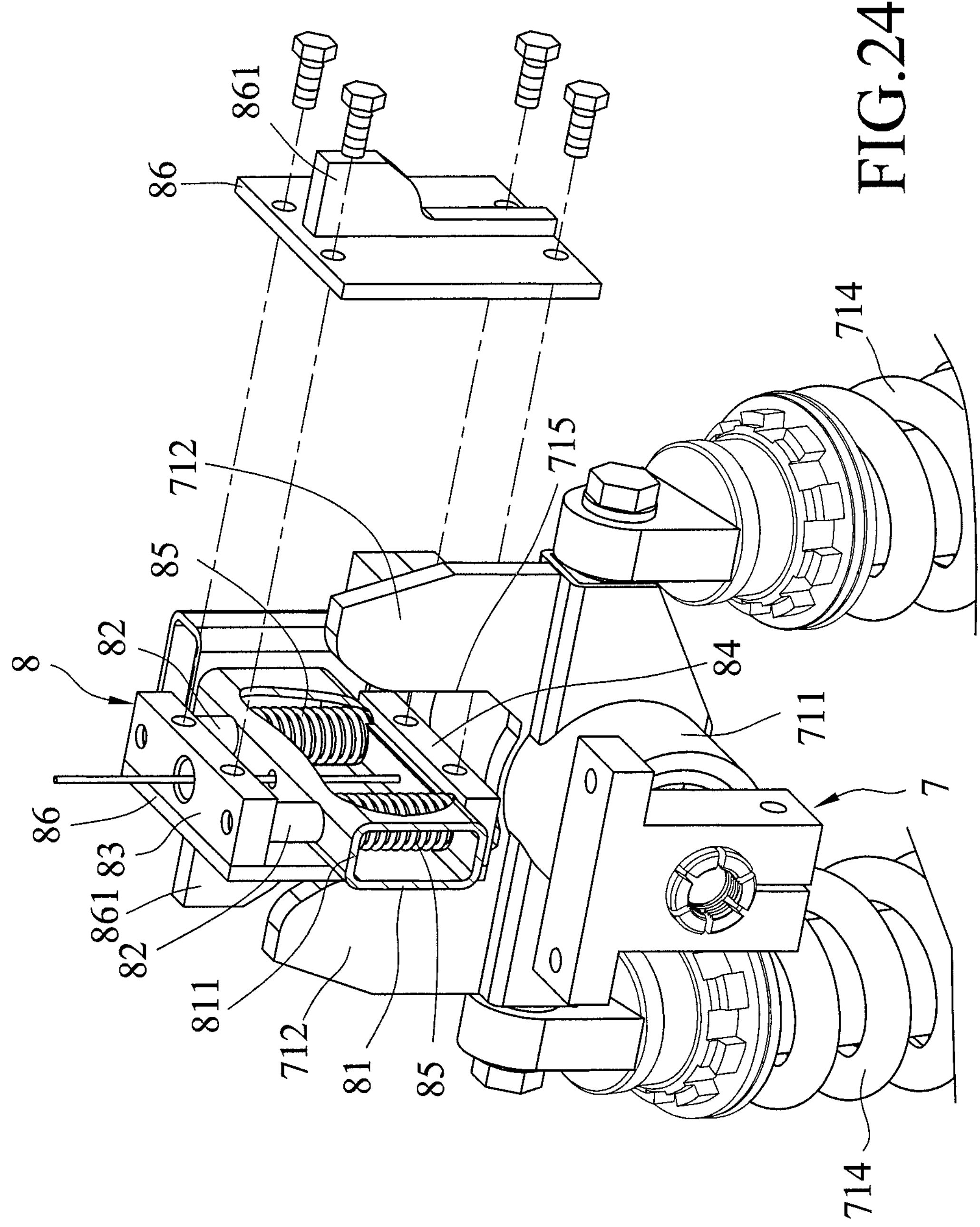
FIG. 24 is a fragmentary, partly-exploded perspective view of the twelfth embodiment.

Referring to FIGS. 22 to 24, in a twelfth embodiment, the left and right arm ends 712 of the rear seesaw arm 711 of the rear-wheel counteracting mechanism 7 extend upwardly to define therebetween a V-shaped retaining slot 715 which opens upwardly. The frame further includes a retaining mechanism 8 mounted in the retaining slot 715.

The retaining mechanism 8 is operated to be displaced between a retaining position, where the retaining mechanism 8 is retainingly engaged with the left and right arm ends 712 to thereby prevent the pivoting movement of the rear seesaw arm 711 about the central pivot axle 710, and a releasing position, where the retaining mechanism 8 is disengaged from the left and right arm ends 712 to thereby permit the pivoting movement of the rear seesaw arm 711 relative to the vehicle body mechanism 2.

Specifically, the retaining mechanism 8 includes a housing 81 which is securely mounted on the vehicle body mechanism 2 and which has an upper housing wall 811, two guiding posts 82 which extend in the upper-and-lower direction and which are movably disposed on the upper housing wall 811, upper and lower crosspieces 83, 84 which extend to interconnect the guiding posts 82, left and right retaining blocks 86 which are securely mounted on the upper and lower crosspieces 83, 84, which are respectively disposed at left and right sides of the housing 81 to be moved in the upper-and-lower direction with the upper and lower crosspieces 83, 84, and which respectively have retaining portions 861 that respectively extend leftwardly and rightwardly and that are moved to abut against the left and right arm ends 712 to place the retaining mechanism 8 in the retaining position (as shown in FIG. 22), and two tension springs 85 which are sleeved on the guiding posts 82 and which abut against the lower crosspiece 84 and the upper housing wall 811 to bias the retaining portions 861 downwardly to the left and right arm ends 712.

When the retaining mechanism 8 is in the retaining position, the upper crosspiece 83 abuts against the upper housing wall 811, and the retaining portions 861 respectively abut against the left and right arm ends 712 to prevent the pivoting movement of the rear seesaw arm 711 relative to the vehicle body mechanism 2, so as to guard against the opposite upward and downward movements of the rear wheels 62. In this state, the rear wheels 62 are kept at the same height level and in contact with the ground, which facilitates steady movement of the vehicle when the vehicle moves slowly.

Figure 25:
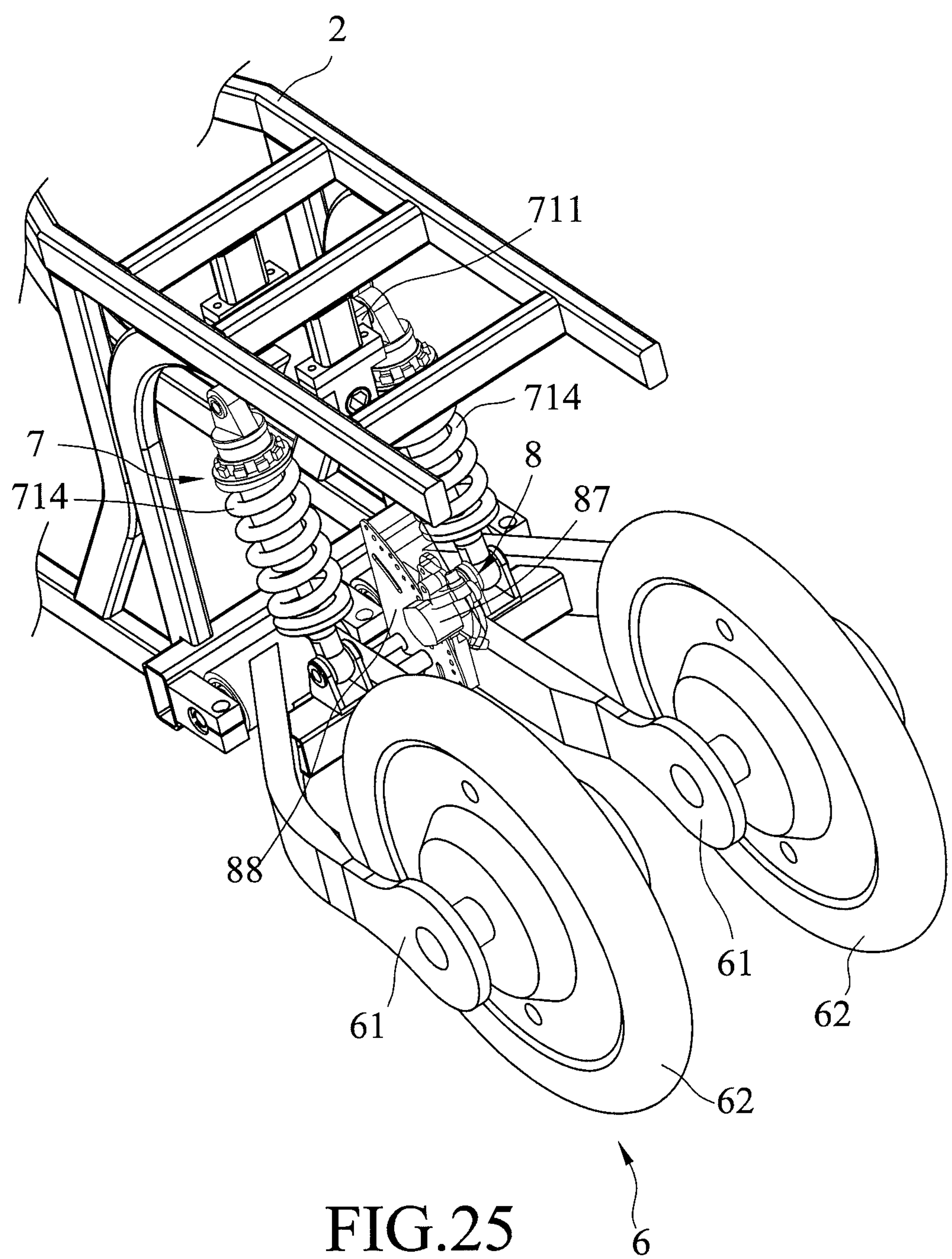
FIG. 25 is a fragmentary perspective view of a thirteenth embodiment of the frame according to the disclosure.
Figure 26:
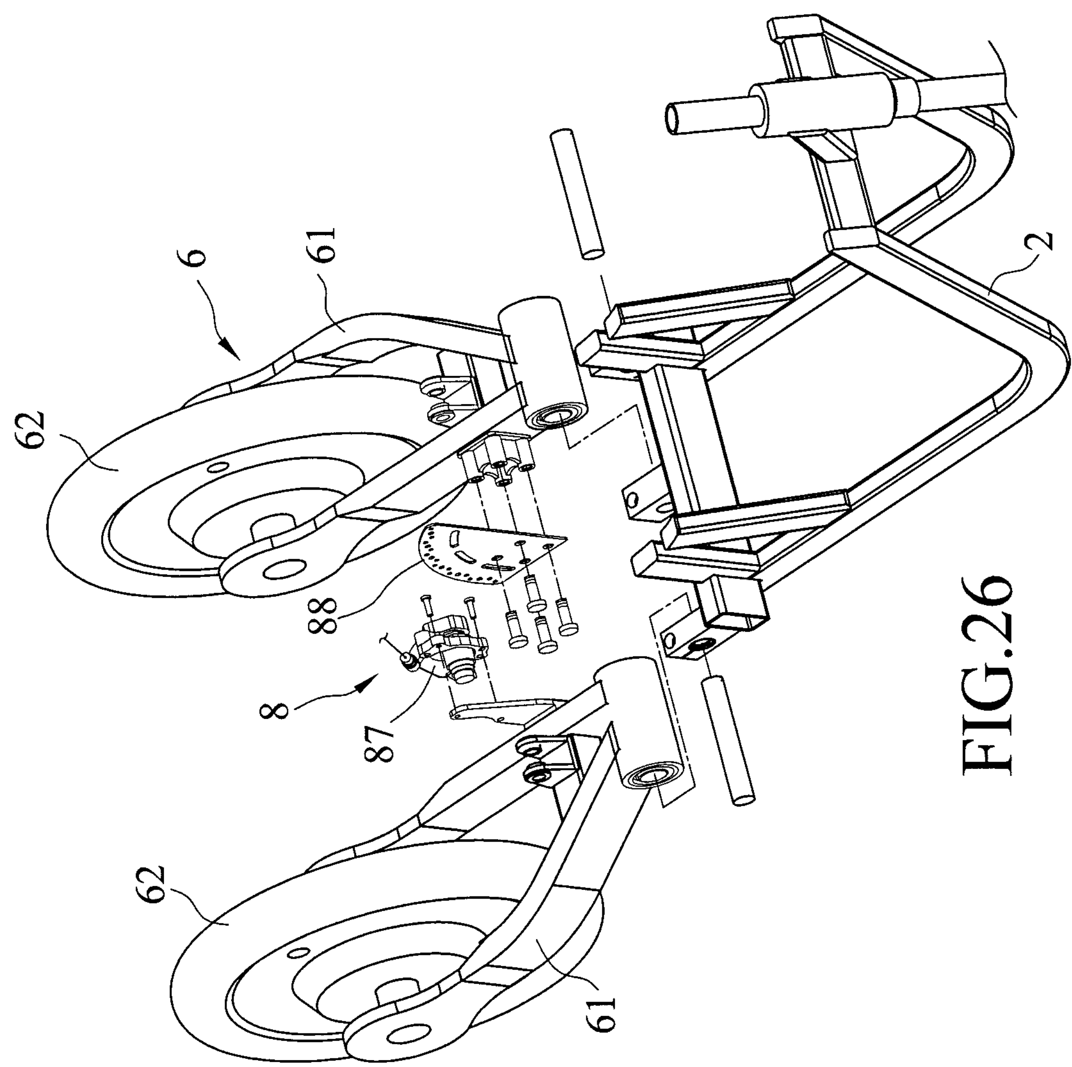
FIG. 26 is a fragmentary, partly-exploded perspective view of the thirteenth embodiment.

Alternatively, referring to FIGS. 25 and 26, in a thirteenth embodiment, the retaining mechanism 8 includes a brake caliper 87 and a brake disc 88 which are respectively disposed on the rear wheel forks 61.

The brake caliper 87 is operable to be in frictional engagement with the brake disc 88 so as to prevent relative pivoting movement of the rear wheel forks 61. When the brake caliper 87 is disengaged from the brake disc 88, the rear wheels 62 are movable relative to each other by the rear wheel forks 61 such that the rear-wheel counteracting mechanism 7 can function properly. When the brake caliper 87 is operated to be in frictional engagement with the brake disc 88, the rear wheel forks 61 cannot make opposite upward and downward movements, which facilitates slow and steady movement of the vehicle and parking thereof.

In this embodiment, the brake caliper 87 is a known hydraulic brake caliper for a motorcycle and is operated by hydraulic fluid. Alternatively, the brake caliper 87 may be a mechanically retaining member, such as that having a latch or a pin to lock the brake disc 88.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A frame of a vehicle with two front wheels, comprising:

a vehicle body mechanism including a head tube;

a front wheel frame mechanism including a front fork unit which is pivotably connected to said head tube to be rotatable about said head tube, a crank axle which is disposed on and extends in a left-and-right direction from a lower fork end portion of said front fork unit, and two front-wheel cranks each of which is pivoted on said crank axle at a crank end thereof, each of said front-wheel cranks having a free end which is swingable about said crank axle and on which a respective one of the front wheels is pivotably disposed, each of said front-wheel cranks having a front exerting force pivot point which is interposed between said crank end and said free end, said front fork unit having a front fork tube which is pivoted on said head tube and which extends in an upper-and-lower direction to have said lower fork end portion on which said crank axle is disposed, said front-wheel cranks being disposed at left and right sides of said front fork tube;

a front-wheel counteracting mechanism pivotably connected between said front exerting force pivot points of said front-wheel cranks and said front fork tube of said front fork unit, said front-wheel counteracting mechanism including a pivot axle which extends from said front fork unit, a front seesaw arm which is pivotably disposed on said pivot axle at a middle portion thereof and which has left and right arm ends, and two front damping members, each of which is pivotably connected between one of said left and right arm ends and said front exerting force pivot point of a respective one of said front-wheel cranks and which is configured to transmit upward and downward movements of the front wheels, to absorb shocks subjected onto the front wheels, and, while off the ground, to permit said front-wheel cranks to be moved slowly and downwardly relative to said front fork unit so as to keep the front wheels in a proper position for retouching down and to ensure a smooth landing; and a rear wheel frame mechanism mounted on said vehicle body mechanism and on which at least one rear wheel is pivotably mounted.

2. The frame as claimed in claim 1, wherein said front fork unit includes a front fork shaft which extends in an upper-and-lower direction through said head tube to be rotatable relative to said head tube and to have upper and lower shaft ends, upper and lower brackets which are respectively disposed on said upper and lower shaft ends of said front fork shaft and each of which has left and right bracket ends, and two front fork tubes, one of said front fork tubes extending in the upper-and-lower direction through said left bracket ends of said upper and lower brackets to have said lower fork end portion, and the other one of said front fork tubes extending in the upper-and-lower direction through said right bracket ends of said upper and lower brackets to have said lower fork end portion, said crank axle being disposed on said lower fork end portions and below said lower bracket, said front-wheel cranks being disposed inwardly of said lower fork end portions of said front fork tubes, said front-wheel counteracting mechanism being pivotably connected between said front exerting force pivot point and said front fork shaft.

3. The frame as claimed in claim 1, wherein said frame is adapted to be used with a locking member, said front seesaw arm having a locking slot disposed to be releasably engaged with the locking member so as to retain said front seesaw arm and to prevent pivoting movement of said front seesaw arm about said pivot axle.

4. The frame as claimed in claim 1, wherein said left and right arm ends respectively have pivot points at which said front damping members are respectively and pivotably connected, each of said pivot points of said left and right arm ends of said front seesaw arm being higher than a center of said pivot axle.

5. The frame as claimed in claim 1, wherein said front-wheel counteracting mechanism includes upper and lower fluid pipes each of which is connected between and in fluid communication with said front damping members, each of said front damping members including a cylinder which extends downwardly, and a piston which has a disk segment that is slidably disposed in said cylinder to partition an inner space of said cylinder into an upper fluid chamber and a lower fluid chamber, and a rod segment that extends downwardly through said cylinder to be pivotably connected to said front exerting force pivot point, said upper fluid pipe being in communication between said upper fluid chambers, said lower fluid pipe being in communication between said lower fluid chambers.

6. The frame as claimed in claim 1, wherein said rear wheel frame mechanism includes two rear wheel forks which are coaxially and pivotably connected to said vehicle body mechanism to be rotatable relative to said vehicle body mechanism about a pivot axis, which are spaced apart from each other in the left-and-right direction, and which extend rearwardly for two rear wheels to be rotatably mounted thereon about a rear wheel axis, each of said rear wheel forks having a rear exerting force pivot point which is interposed between the pivot axis and the rear wheel axis, said frame further comprising a rear-wheel counteracting mechanism which is pivotably connected to said rear exerting force pivot points of said rear wheel forks and said vehicle body mechanism, and which is configured to transmit upward and downward movements of the rear wheels, to absorb shocks subjected onto the rear wheels, and to keep the rear wheels, while off the ground, in a proper position for retouching down.

7. The frame as claimed in claim 6, wherein said rear-wheel counteracting mechanism includes a central pivot axle which extends in a front-and-rear direction from said vehicle body mechanism, a rear seesaw arm which is pivotably disposed on said central pivot axle at a middle portion thereof and which has left and right arm ends, and two rear damping members, each of said rear damping members being pivotably connected to said rear exerting force pivot point and extends upwardly to be pivotably connected to a respective one of said left and right arm ends of said rear seesaw arm.

8. The frame as claimed in claim 7, wherein said left and right arm ends of said rear seesaw arm respectively have pivot points at which said rear damping members are respectively and pivotably connected, each of said pivot points of said left and right arm ends of said rear seesaw arm being higher than a center of said central pivot axle.

9. The frame as claimed in claim 7, wherein said left and right arm ends of said rear seesaw arm extend upwardly to define therebetween a retaining slot opened upwardly, said frame further comprising a retaining mechanism mounted in said retaining slot, said retaining mechanism being operated to be displaced between a retaining position, where said retaining mechanism is retainingly engaged with said left and right arm ends to thereby prevent pivoting movement of said rear seesaw arm about said central pivot axle, and a releasing position, where said retaining mechanism is disengaged from said left and right arm ends to permit the pivoting movement of said rear seesaw arm relative to said vehicle body mechanism.

10. The frame as claimed in claim 9, wherein said retaining mechanism includes a housing which is securely mounted on said vehicle body mechanism and which has an upper housing wall, two guiding posts which extend in an upper-and-lower direction and which are movably disposed on said upper housing wall, upper and lower crosspieces which extend to interconnect said guiding posts, left and right retaining blocks which are securely mounted on said upper and lower crosspieces, which are respectively disposed at left and right sides of said housing to be moved in the upper-and-lower direction with said upper and lower crosspieces, and which respectively have retaining portions that respectively extend leftwardly and rightwardly and that are moved to abut against said left and right arm ends to place said retaining mechanism in the retaining position, and two tension springs which are sleeved on said guiding posts and which abut against said lower crosspiece and said upper housing wall to bias said retaining portions to said left and right arm ends.

11. The frame as claimed in claim 6, wherein said rear-wheel counteracting mechanism includes a coaxial gearbox mounted on said vehicle body mechanism, two counteracting cranks respectively disposed at left and right sides of said coaxial gearbox, and two rear damping members, each pivotably connected to said rear exerting force pivot point of a respective one of said rear wheel forks, and extending upwardly to be pivotably connected to a respective one of said counteracting cranks, said coaxial gearbox having a box body which is securely mounted on said vehicle body mechanism, an idle gear which is rotatably disposed in said box body, and two rear gear shafts which are coaxially and pivotably disposed on said box body and which respectively have bevel gear portions that mesh with said idle gear, so as to cause rotations of said rear gear shafts in opposite rotational directions, each of said counteracting cranks being securely connected with a respective one of said rear gear shafts, and having a swing end that is swingable with the rotation of the respective one of said rear gear shafts and that is pivotably connected to a respective one of said rear damping members, such that rotations of said rear gear shafts in opposite rotational directions through said idle gear result in upward and downward movements of said swing ends of said counteracting cranks.

12. The frame as claimed in claim 6, wherein said rear-wheel counteracting mechanism includes two rear damping members each of which is pivotably connected to said rear exerting force pivot point of a respective one of said rear wheel forks and extends upwardly to be pivotably connected to said vehicle body mechanism, and upper and lower fluid pipes each of which is connected between and in fluid communication with said rear damping members, each of said rear damping members including a cylinder which is pivotably connected to said vehicle body mechanism and which extends downwardly, and a piston which has a disk segment that is slidably disposed in said cylinder to partition an inner space of said cylinder into an upper fluid chamber and a lower fluid chamber, and a rod segment that extends downwardly through said cylinder to have a lower end pivotably connected to said rear exerting force pivot point, said upper fluid pipe being in communication between said upper fluid chambers, said lower fluid pipe being in communication between said lower fluid chambers.

13. The frame as claimed in claim 12, wherein said rear-wheel counteracting mechanism includes a pressure storing member which is connected to and in fluid communication with said lower fluid pipe, said rod segment of said piston having an upper rod portion which extends downwardly from said disk segment, and a lower cylinder portion which is movably sleeved on and which extends downwardly from said upper rod portion through said cylinder, each of said rear damping members including a biasing spring which is disposed in said cylinder and between said disk segment and said lower cylinder portion so as to bias said lower cylinder portion to move away from said disk segment.

14. The frame as claimed in claim 6, further comprising a retaining mechanism which includes a brake caliper and a brake disc that are respectively disposed on said rear wheel forks, said brake caliper being operable to be in frictional engagement with said brake disc so as to prevent relative pivoting movement of said rear wheel forks.

15. A frame of a vehicle with two front wheels, comprising:

a vehicle body mechanism including a head tube;

a front wheel frame mechanism including a front fork unit which is pivotably connected to said head tube to be rotatable about said head tube, a crank axle which is disposed on and extends in a left-and-right direction from a lower fork end portion of said front fork unit, and two front-wheel cranks each of which is pivoted on said crank axle at a crank end thereof, each of said front-wheel cranks having a free end which is swingable about said crank axle and on which a respective one of the front wheels is pivotably disposed, each of said front-wheel cranks having a front exerting force pivot point which is interposed between said crank end and said free end, said front fork unit having a front fork tube which is pivoted on said head tube and which extends in an upper-and-lower direction to have said lower fork end portion on which said crank axle is disposed, said front-wheel cranks being disposed at left and right sides of said front fork tube;

a front-wheel counteracting mechanism pivotably connected between said front exerting force pivot points of said front-wheel cranks and said front fork tube of said front fork unit, said front-wheel counteracting mechanism includes a gearbox mounted on said front fork unit and having a gear, two racks extending in an upper-and-lower direction, disposed at two opposite sides of said gear and meshing with said gear to be moved in opposite upward and downward movements, and two front damping members, each of which is pivotably connected to said front exerting force pivot point of a respective one of said front-wheel cranks and extends upwardly to be pivotably connected to a respective one of said racks, and which is configured to transmit upward and downward movements of the front wheels, to absorb shocks subjected onto the front wheels and, while off the ground, to permit said front-wheel cranks to be moved slowly and downwardly relative to said front fork unit so as to keep the front wheels in a proper position for retouching down and to ensure a smooth landing; and a rear wheel frame mechanism mounted on said vehicle body mechanism and on which at least one rear wheel is pivotably mounted.

16. A frame of a vehicle with two front wheels, comprising:

a vehicle body mechanism including a head tube;

a front wheel frame mechanism including a front fork unit which is pivotably connected to said head tube to be rotatable about said head tube, a crank axle which is disposed on and extends in a left-and-right direction from a lower fork end portion of said front fork unit, and two front-wheel cranks each of which is pivoted on said crank axle at a crank end thereof, each of said front-wheel cranks having a free end which is swingable about said crank axle and on which a respective one of the front wheels is pivotably disposed, each of said front-wheel cranks having a front exerting force pivot point which is interposed between said crank end and said free end, said front fork unit having a front fork tube which is pivoted on said head tube and which extends in an upper-and-lower direction to have said lower fork end portion on which said crank axle is disposed, said front-wheel cranks being disposed at left and right sides of said front fork tube;

a front-wheel counteracting mechanism pivotably connected between said front exerting force pivot points of said front-wheel cranks and said front fork tube of said front fork unit, said front-wheel counteracting mechanism includes a coaxial gearbox mounted on said front fork unit, two counteracting cranks respectively disposed at left and right sides of said coaxial gearbox, and two front damping members, each pivotably connected to said front exerting force pivot point of a respective one of said front-wheel cranks and extending upwardly to be pivotably connected to a respective one of said counteracting cranks, said coaxial gearbox having a box body which is securely mounted on said front fork unit, an idle gear which is rotatably disposed in said box body, and two front gear shafts which are coaxially and pivotably disposed on said box body and which respectively have bevel gear portions that mesh with said idle gear so as to cause rotations of said front gear shafts in opposite rotational directions, each of said counteracting cranks being securely connected with a respective one of said front gear shafts, and having a free end that is swingable with the rotation of the respective one of said front gear shafts and that is pivotably connected to a respective one of said front damping members, such that rotations of said front gear shafts in opposite rotational directions through said idle gear result in upward and downward movements of said free ends of said counteracting cranks, each of said front damping members being configured to transmit upward and downward movements of the front wheels, to absorb shocks subjected onto the front wheels and, while off the ground, to permit said front-wheel cranks to be moved slowly and downwardly relative to said front fork unit so as to keep the front wheels in a proper position for retouching down and to ensure a smooth landing; and a rear wheel frame mechanism mounted on said vehicle body mechanism and on which at least one rear wheel is pivotably mounted.

* * * * *